(12) United States Patent
Wang et al.

(10) Patent No.: US 11,979,793 B2
(45) Date of Patent: May 7, 2024

(54) POSITIONING DEVICE AND METHOD FOR CALCULATING A POSITION OF A MOBILE DEVICE

(71) Applicant: HUAWEI TECHNOLOGIES CO., LTD., Guangdong (CN)

(72) Inventors: Qi Wang, Munich (DE); Richard Stirling-Gallacher, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 511 days.

(21) Appl. No.: 17/213,646

(22) Filed: Mar. 26, 2021

(65) Prior Publication Data

US 2021/0219103 A1    Jul. 15, 2021

Related U.S. Application Data

(63) Continuation of application No. PCT/EP2018/076422, filed on Sep. 28, 2018.

(51) Int. Cl.
*H04W 4/029* (2018.01)
*G01S 5/00* (2006.01)
*G01S 5/02* (2010.01)

(52) U.S. Cl.
CPC .............. *H04W 4/029* (2018.02); *G01S 5/00* (2013.01); *G01S 5/0236* (2013.01)

(58) Field of Classification Search
CPC ........ H04W 4/029; H04W 4/02; H04W 64/00
See application file for complete search history.

(56) References Cited

U.S. PATENT DOCUMENTS

2012/0258733 A1    10/2012    Fischer et al.
2015/0296359 A1    10/2015    Edge
(Continued)

FOREIGN PATENT DOCUMENTS

CN    102246581 A    11/2011
CN    103428749 A    12/2013
(Continued)

OTHER PUBLICATIONS

3GPP TS 36.455 V15.1.0 (Sep. 2018), 3rd Generation Partnership Project; Technical Specification Group Radio Access Network; Evolved Universal Terrestrial Radio Access (E-UTRA); LTE Positioning Protocol A (LPPa) (Release 15), 83 pages.
(Continued)

*Primary Examiner* — Barry W Taylor

(57) ABSTRACT

The present invention relates to determining a position of a mobile device, and in particular signaling for on-demand positioning reference signal configuration, for example, in 5G new radio. The present invention provides a positioning device for calculating a position of a mobile device. The positioning device is configured to determine a measurement quality, and/or a reference signal type and configuration based on a positioning request, to determine a reference signal configuration request based on at least the measurement quality, and/or the reference signal type and configuration, to obtain a measurement result based on a reference signal configured according to the reference signal configuration request, and to calculate the position based on at least the measurement result.

4 Claims, 26 Drawing Sheets

(56) References Cited

U.S. PATENT DOCUMENTS

| | | | | |
|---|---|---|---|---|
| 2016/0095080 | A1* | 3/2016 | Khoryaev | G01S 5/0284 |
| | | | | 455/456.1 |
| 2018/0220392 | A1* | 8/2018 | Ly | H04W 64/00 |
| 2020/0107286 | A1* | 4/2020 | Akkarakaran | H04L 5/0048 |
| 2021/0219259 | A1* | 7/2021 | Da | H04W 72/51 |
| 2021/0289466 | A1* | 9/2021 | Siomina | H04L 5/0048 |

FOREIGN PATENT DOCUMENTS

| | | |
|---|---|---|
| CN | 107438258 A | 12/2017 |
| CN | 108092754 A | 5/2018 |
| CN | 108541061 A | 9/2018 |
| WO | 2017196510 A1 | 11/2017 |
| WO | 2019197036 A1 | 10/2019 |

OTHER PUBLICATIONS

3GPP TS 23.032 V15.1.0 (Sep. 2018), 3rd Generation Partnership Project; Technical Specification Group Services and System Aspects; Universal Geographical Area Description (GAD) (Release 15), 32 pages.

3GPP TS 38.455 V15.1.0 (Sep. 2018), 3rd Generation Partnership Project; Technical Specification Group Radio Access Network; NG-RAN; NR Positioning Protocol A (NRPPa) (Release 15), 60 pages.

3GPP TR 22.872 V16.1.0 (Sep. 2018), 3rd Generation Partnership Project; Technical Specification Group Services and System Aspects; Study on positioning use cases; Stage 1 (Release 16), 75 pages.

3GPP TS 23.271 V15.1.0 (Sep. 2018), 3rd Generation Partnership Project; Technical Specification Group Services and System Aspects; Functional stage 2 description of Location Services (LCS) (Release 15), 184 pages.

3GPP TS 22.261 V16.5.0 (Sep. 2018), 3rd Generation Partnership Project; Technical Specification Group Services and System Aspects; Service requirements for the 5G system; Stage 1 (Release 16), 67 pages.

3GPP TS 36.355 V15.0.0 (Jun. 2018), 3rd Generation Partnership Project; Technical Specification Group Radio Access Network; Evolved Universal Terrestrial Radio Access (E-UTRA); LTE Positioning Protocol (LPP)(Release 15), 216 pages.

3GPP TR 23.731 V0.6.0 (Aug. 2018), 3rd Generation Partnership Project; Technical Specification Group Services and System Aspects; Study on Enhancement to the 5GC LoCation Services(Release 16), 144 pages.

3GPP TR 38.913 V15.0.0 (Jun. 2018), 3rd Generation Partnership Project; Technical Specification Group Radio Access Network; Study on Scenarios and Requirements for Next Generation Access Technologies; (Release 15), 39 pages.

International Search Report and Written Opinion issued in PCT/EP2018/076422, dated May 24, 2019, 13 pages.

Office Action issued in CN201880098272.6, dated Oct. 8, 2021, 9 pages.

* cited by examiner

POSITIONING DEVICE AND METHOD FOR CALCULATING A POSITION OF A MOBILE DEVICE

CROSS-REFERENCE TO RELATED APPLICATIONS

This application is a continuation of International Application No. PCT/EP2018/076422, filed on Sep. 28, 2018, the disclosure of which is hereby incorporated by reference in its entirety.

TECHNICAL FIELD

The present invention relates to a device, method and system for determining a position of a mobile device. The present invention in particular relates to signaling for on-demand positioning reference signal (RefSig) configuration in 5G new radio (NR).

BACKGROUND

In the prior art, high accuracy positioning has been identified as one of the key features for next generation cellular systems, and a number of positioning use cases are studied. A performance gap in terms of positioning accuracy has been found especially in global navigation satellite system (GNSS) denied environments. Given the potentials of the NR radio access technology (RAT), 5G location/positioning services are designed for commercial positioning use cases, and to support a range of accuracy levels, latency levels and device categories. Such services shall also exploit high bandwidth, massive antenna systems, network architecture/functionalities (e.g., heterogeneous network, broadcast, multimedia broadcast multicast service (MBMS)) and deployment of a massive number of devices. Also, both indoor and outdoor use cases shall be supported.

For a RAT-assisted positioning scenario, determining the position of a user equipment (UE) consists of two main steps, namely radio signal measurements and positioning estimation computation based on the measurements. Radio signal measurements are obtained using reference signals.

In the common prior art, typical RAT-dependent positioning methods are network based Observed Time Difference of Arrival (OTDoA) and Uplink Time Difference of Arrival (UTDoA). For both schemes, UE locations are calculated at a location server in a core network (CN). Further, RefSig configurations are determined by the network (cf. TS 36.455 and TS 38.455). Since it is designed to meet operational requirements of the network, RefSig configurations are determined by the network. The drawback of such is that, with the network-oriented RefSig design, it is difficult to meet diverse requirements of commercial positioning use cases.

Further, a number of hybrid positioning methods are supported by the state of the art cellular radio networks (cf. TS 23.271). However since in said methods, a location server is deployed in the CN, all types or measurements obtained by a target UE, including RAT-independent measurements, must be sent to the location server so that hybrid positioning methods can be applied (cf. TS 36.355). As the number of commercial location request increases, this may cause huge overhead.

Further, there are cooperative positioning approaches, which provide a signaling scheme to enable cooperating UEs to exchange position information with a target UE and/or to configure extra signals as required, so that the position of the target UE can be improved.

US 2012/0258733 A1 discloses a method for providing network-based measurements for UE-based positioning. However, these radio-based measurements are first collected at a location server and then provided to a UE, introducing extra overhead. Also, sidelink measurements are not considered.

WO2017/196510A1 discloses a multi-tier architecture which can be applied to a 5G network. The documents lists various characteristics of a Terrestrial Positioning Signal (TPS), however procedures for TPS configuration are not defined.

That is, in the prior art, there is the lack of a way to flexibly configure a reference signal for position calculation, which takes into account positioning accuracy, latency and capability of receiving devices.

SUMMARY

In view of the above-mentioned problems and disadvantages, the present invention aims to improve the conventional positioning devices and methods.

The present invention has the object to provide a RefSig configuration mechanism and corresponding signaling procedures which aim to allow for flexible configuration, taking into account positioning accuracy, latency and capability of receiving devices. The present invention in particular aims to support diverse system design options, namely network-based positioning, UE-based positioning and RAT-assisted hybrid positioning. In particular, the present invention supports measurements on the sidelink.

The present invention therefore makes use of four positioning functional blocks, namely positioning engine (PosEng), which is also going to be called positioning device, a radio resource controller (RRC), a reference signal transmitter (RefSig TX) and a reference signal receiver (RefSig RX). Functionalities and implementation examples of these four functional blocks can be summarized as the following:

The positioning device can handle location requests and understand location service requirements, e.g., positioning/measurement accuracy, latency, etc. It can determine a positioning method and a corresponding measurement quality required. It also can determine the content of a positioning RefSig request (which is also going to be called reference signal configuration request) and can send the RefSig request to a corresponding RRC. The positioning device can collect any type of positioning measurements in order to achieve high positioning performance, and can calculate a position based on the measurements.

Implementation examples of the positioning device may include to arrange the positioning device in a location server in a CN (e.g., E-SMLC in EPS, LMF in 5GC) or in an entity associated with CN such as in the cloud/edge; in a local location management function in a radio access network (RAN) or a UE, e.g., a Location Management Component in TS 23.731; in a location server function implemented in an entity associated with a RAN, or a UE-type device such as a vehicle; in an external localization application which may access a network service platform using certain APIs.

The RRC can handle a RefSig request and determine a RefSig transmission strategy, e.g., unicast, multicast, or broadcast. It also can allocate a radio resource for the RefSig and determine a RefSig configuration for positioning. The RRC can inform the RefSig TX and RefSig RX about the RefSig configuration.

Implementation examples of a RRC may include to arrange the RRC in a scheduler in a base station, an eNB, or a centralized unit in RAN; in a resource allocation function implemented in a UE-type device which is capable of coordinating a resource for sidelink transmission, e.g., selecting a resource within a pre-configured resource pool.

The RefSig TX can transmit a RefSig for positioning-related measurement.

Implementation examples of a RefSig TX may include the following: When a RefSig is transmitted in downlink transmission, the TX is typically a base station, eNB, Remote Radio Unit (RRU), Transmit-Receive-Point (TRP) or a reference point transmitting a reference signal for positioning, such as transmission beacons in terrestrial beacon systems. When a RefSig is transmitted in uplink transmission, the TX is typically a UE or a UE-type device such as a vehicle or a moving object (e.g., on a factory floor). When a RefSig is transmitted in sidelink transmission, the TX can be a UE or a UE-type device, or a UE-type reference point serving as a location reference.

The RefSig RX can receive a RefSig and obtain measurements for positioning using the RefSig.

The implementation examples of a RefSig RX may include: When a RefSig is transmitted in uplink transmission, the RX is typically a base station, eNB, Remote Radio Unit (RRU), Transmit-Receive-Point (TRP) or a reference point carrying out measurement for positioning, e.g., LMU in LTE. When a RefSig is transmitted in downlink transmission, the RX is typically a UE or a UE-type device such as vehicles or moving objects (e.g., on a factory floor). When a RefSig is transmitted in sidelink transmission, the RX can be a UE or a UE-type device, or a UE-type reference point serving as a location reference.

In other words, an on-demand positioning reference signal design is provided by the present invention. Also, new signaling procedures for a positioning estimation engine are provided, to request a reference signal so that desired measurements of required accuracy can be obtained.

Further, the invention provides network measurement capability as a new type of location service. Unlike in data transmission-oriented services, the RefSigs which enable positioning-related measurements are not to be treated as overhead, but as a radio resource generating profit.

A first aspect of the present invention provides a positioning device for calculating a position of a mobile device, the positioning device configured to determine a measurement quality, and/or a reference signal type and configuration based on a positioning request, determine a reference signal configuration request based on at least the measurement quality, and/or the reference signal type and configuration, obtain a measurement result based on a reference signal configured according to the reference signal configuration request, calculate the position based on at least the measurement result.

Preferably, the positioning device is configured to receive the positioning request.

Preferably, the positioning request may be received from at least one of: a mobile device, a base station, a RAN, a CN, a cloud, or an external application.

In an implementation form of the first aspect, the reference signal type is at least one of a downlink (DL) reference signal type, an uplink (UL) reference signal type, or a side link (SL) reference signal type.

Preferably, the positioning device is further configured to determine the reference signal type from a DL reference signal type, an UL reference signal type, and a SL reference signal type.

In other words, the positioning device is generally configured to determine a DL, UL and SL reference signal configuration. That is, all those three types of reference signal configurations (DL, UL and SL) are supported by the positioning device at a same time, however only one of them is determined to be the reference signal type.

The following implementation form corresponds to scenario 1.1 below:

In an implementation form of the first aspect, the reference signal type is a DL reference signal type, and the reference signal configuration request comprises a request for a DL reference signal.

Preferably, in this case, the positioning device is arranged in a user equipment (UE).

In an implementation form of the first aspect, the positioning device is further configured to: send the reference signal configuration request to a radio resource controller (RRC); receive a DL reference signal configuration; receive a DL reference signal corresponding to the reference signal configuration; and obtain DL measurements based on the received DL reference signal.

Preferably, based on the obtained DL measurements, the measurement result is obtained.

Preferably, the DL reference signal configuration is received from the RRC.

Preferably, the reference signal configuration is determined by the RRC that is arranged in a RAN, and is transmitted to the positioning device by the RAN.

This is beneficial, as it allows for a UE-based hybrid positioning method and avoids the signaling overhead by transmitting all measurements to the location server in the network. It is further beneficial since it exploits the coverage of the RAN to provide positioning reference/assistance as a new service. This may be a business model for mobile network operators (MNOs).

The following implementation form corresponds to scenario 1.2 below:

In an implementation form of the first aspect, the reference signal type is a UL reference signal type, and the reference signal configuration request comprises a request for a UL reference signal.

Preferably, the positioning device is arranged in a user equipment (UE).

In an implementation form of the first aspect, the positioning device is further configured to send the reference signal configuration request to a RRC; receive an UL reference signal configuration; transmit a UL reference signal configured according to the reference signal configuration; and receive UL measurements based on the transmitted UL reference signal.

Preferably, based on the received UL measurements, the measurement result is obtained.

Preferably, the UL reference signal configuration is received from the RRC.

Preferably, the UL measurements are obtained in the RAN, based on the UL reference signal transmitted by the positioning device and received by the RAN. More specifically, the UL measurements are then sent to the positioning device. Preferably, the reference signal configuration is determined by the RRC that is arranged in a RAN, and is transmitted to the positioning device by the RAN.

This allows for a UE-based hybrid positioning method and avoids the signaling overhead by transmitting all measurements to the location server in the network. It is further beneficial since it exploits the coverage of a RAN to provide positioning reference/assistance as a new service. This may be a new business model for MNOs. Further, it is an advantage to exploit measurement capability on the RAN side, e.g., large antenna arrays which lead to more accurate angle estimations.

The following implementation form corresponds to scenarios 2, 3 and 4 below:

In an implementation form of the first aspect, the reference signal type is a SL reference signal type, and the reference signal configuration request comprises a request for a SL reference signal.

The following implementation form corresponds to scenario 2.1 below:

In an implementation form of the first aspect, the positioning device is further configured to send the reference signal configuration request to a RRC; and receive SL measurements according to the reference signal configuration request.

Preferably, based on the received SL measurements, the measurement result is obtained.

Preferably, the positioning device is arranged in a CN, more preferably in a location server in the CN. The positioning device can alternatively also be arranged in a cloud environment. Preferably, the SL measurements are obtained in a receiving UE, based on an SL reference signal received by the receiving UE and transmitted by a transmitting UE. Preferably, the SL measurements are in turn sent to the positioning device. The SL reference signal is preferably configured by the RRC that is arranged in a RAN according to the reference signal configuration request.

This allows to exploit sidelink measurements in order to improve network-based positioning accuracy. This also ensures that, assisted by relative measurement among UEs, the location server may fuse all types of measurements and jointly estimate the UEs' positions.

The following implementation form corresponds to scenario 2.2 below:

In an implementation form of the first aspect, the positioning device is further configured to configure the SL reference signal based on the reference signal configuration request; and receive SL measurements based on the SL reference signal.

Preferably, based on the received SL measurements, the measurement result is obtained.

Preferably, the positioning device is arranged in a RAN. Preferably, obtaining the measurement results comprises receiving the SL measurements from a UE. The SL measurements are in particular obtained by the UE, based on a SL reference signal received by the UE. The SL reference signal is configured by the positioning device in the RAN, but then can be transmitted by any device in a communication system that communicates with the positioning device and is capable of sending the signal, e.g., a base station (BS) or a UE.

This allows to exploit sidelink measurements in order to improve network-based positioning accuracy. Further, this ensures that, assisted by relative measurement among UEs, the location server function in the RAN may fuse all types of measurements and jointly estimate the UEs' positions. Also, in comparison to a CN-based variant, the RAN-based approach provides an efficient positioning system design for C-RAN architecture, enable network-based positioning with reduced signaling overhead and short latency.

The following implementation form corresponds to scenarios 3.1 and 3.2 below:

In an implementation form of the first aspect, the positioning device is further configured to send the reference signal configuration request to a RRC; receive a SL reference signal configuration; receive a SL reference signal configured according to the reference signal configuration; and obtain SL measurements based on the received SL reference signal.

Preferably, based on the obtained SL measurements, the measurement result is obtained.

Preferably, the SL reference signal configuration is received from the RRC that is arranged in a RAN.

The positioning device can in particular be arranged in a target UE. More specifically, a position of the target UE is calculated. The SL reference signal is particularly transmitted by an assisting UE in this case.

This is beneficial, as it allows the target UE to request a sidelink reference signal from the desired assisting UEs, hence cooperative positioning and relative positioning between UEs can be enabled. This also allows for a UE-based hybrid positioning method and avoids the signaling overhead by transmitting all measurements to the location server in the network. Further, this exploits the coverage of RAN to provide positioning reference as a new service. This may be a business model for MNOs.

Alternatively, the positioning device can in particular be located in a Master UE. Specifically, the SL reference signal is transmitted by a target UE in this case. The position of the target UE is calculated.

Preferably, the reference signal configuration is determined by the RRC arranged in a RAN, and is transmitted to the target UE, or respectively to the Master UE.

This is beneficial as it allows the Master UE with location server function to request a sidelink reference signal from the target UEs. The Master UE can be a grouped UE leader, e.g., a platoon leader in a vehicular communication scenario, which is capable of providing location service to other UEs in the vicinity. This requires a minimum functionality implementation at the target UEs, e.g., to suit for IoT applications.

The following implementation form corresponds to scenarios 4.1 and 4.3 below:

In an implementation form of the first aspect, the positioning device is further configured to obtain a SL reference signal configuration based on the reference signal configuration request; transmit the SL reference signal configuration; receive a SL reference signal configured according to the SL reference signal configuration; and obtain SL measurements based on the received SL reference signal.

Preferably, based on the obtained SL measurements, the measurement result is obtained.

Preferably, the positioning device is arranged in a UE, more preferably a target UE. More specifically, a position of the target UE is calculated. The reference signal configuration is in particular transmitted to an assisting UE. The SL reference signal is in particular transmitted by an assisting UE.

This is beneficial, as it allows the target UE to request a sidelink reference signal from the desired assisting UEs and to improve UE-based positioning accuracy. It also enables cooperative positioning and relative positioning between UEs. Further, it allows for a UE-based hybrid positioning method with radio assistance.

In an alternative scenario, preferably, the positioning device is arranged in a Master UE. More specifically, a position of a target UE is calculated by the Master UE. The reference signal is in particular transmitted to the Master UE by the Target UE.

This is beneficial as it allows the Master UE to serve as a local fusion center and to provide location service to the target UEs. Examples include a flexibly deployed UE-type location center for a geographical area with enhanced location service such as factory floor. This requires a minimum functionality implementation at the target UE, e.g., to suit for IoT applications.

The following implementation form corresponds to scenario 4.2 below:

In an implementation form of the first aspect, the positioning device is further configured to send the reference signal configuration request to a user equipment (UE); receive a SL reference signal configured according to the reference signal configuration request; and obtain SL measurements based on the received SL reference signal.

Preferably, based on the obtained SL measurements, the measurement result is obtained.

The positioning device can in particular be arranged in a target UE. More specifically, a position of the target UE is calculated. The SL reference signal is in particular transmitted by an assisting UE in this case. The reference signal configuration is in particular obtained by the assisting UE, based on the received reference signal configuration request.

This is beneficial as it allows the target UE to request a sidelink reference signal from the desired assisting UEs and to improve UE-based positioning accuracy. It further enables cooperative positioning and relative positioning between UEs. It also allows for a UE-based hybrid positioning method with radio assistance.

The following implementation forms correspond to all scenarios below:

In an implementation form of the first aspect, the reference signal configuration request comprises at least one of a first measurement report configuration, a second configuration, a periodicity, or a number of repetitions.

Preferably, the first measurement report configuration comprises, e.g., time of arrival (ToA), time difference of arrival (TDoA), an angle of signal departure or arrival, or a signal transmission resource indicator. Preferably, the second configuration includes a bandwidth, a number of reference signals, or a beam direction.

In an implementation form of the first aspect, the reference signal configuration comprises at least one of a second measurement report configuration, a granted configuration, a periodicity, or a number of repetitions.

Preferably, a measurement report configuration comprises, e.g. time of arrival (ToA), time difference of arrival (TDoA), an angle of signal departure or arrival, or a signal transmission resource indicator. Wherein the granted configuration includes a bandwidth, a number of reference signals, or a beam direction.

A second aspect of the present invention provides a method for calculating a position of a mobile device, the method comprising the steps of determining, by the positioning device, a measurement quality, and/or a reference signal type and configuration based on a location request; determining, by the positioning device, a reference signal configuration request based on at least the measurement quality, and/or the reference signal type and configuration; obtaining, by the positioning device, a measurement result based on a reference signal configured according to the reference signal configuration request; calculating, by the positioning device, the position, based on at least the measurement result.

In an implementation form of the second aspect, the reference signal type is at least one of a downlink (DL) reference signal type, an uplink (UL) reference signal type, or a side link (SL) reference signal type.

In an implementation form of the second aspect, the reference signal type is a DL reference signal type, and the reference signal configuration request comprises a request for a DL reference signal.

In an implementation form of the second aspect, the method further comprises, sending, by the positioning device, the reference signal configuration request to a radio resource controller (RRC); receiving, by the positioning device, a DL reference signal configuration; receiving, by the positioning device, a DL reference signal corresponding to the reference signal configuration; and obtaining, by the positioning device, DL measurements based on the received DL reference signal.

In an implementation form of the second aspect, the reference signal type is a UL reference signal type, and the reference signal configuration request comprises a request for a UL reference signal.

In an implementation form of the second aspect, the method further comprises sending, by the positioning device, the reference signal configuration request to a RRC; receiving, by the positioning device, an UL reference signal configuration; transmitting, by the positioning device, a UL reference signal configured according to the reference signal configuration; and receiving, by the positioning device, UL measurements based on the transmitted UL reference signal.

In an implementation form of the second aspect, the reference signal type is a SL reference signal type, and the reference signal configuration request comprises a request for a SL reference signal.

In an implementation form of the second aspect, the method further comprises sending, by the positioning device, the reference signal configuration request to a RRC; and receiving, by the positioning device, SL measurements according to the reference signal configuration request.

In an implementation form of the second aspect, the method further comprises configuring, by the positioning device, the SL reference signal based on the reference signal configuration request; and receiving, by the positioning device, SL measurements based on the SL reference signal.

In an implementation form of the second aspect, the method further comprises sending, by the positioning device, the reference signal configuration request to a RRC; receiving, by the positioning device, a SL reference signal configuration; receiving, by the positioning device, a SL reference signal configured according to the reference signal configuration; and obtaining, by the positioning device, SL measurements based on the received SL reference signal.

In an implementation form of the second aspect, the method further includes obtaining, by the positioning device, a SL reference signal configuration based on the reference signal configuration request; transmitting, by the positioning device, the SL reference signal configuration; receiving, by the positioning device, a SL reference signal configured according to the SL reference signal configuration; and obtaining, by the positioning device, SL measurements based on the received SL reference signal.

In an implementation form of the second aspect, the method further includes sending, by the positioning device, the reference signal configuration request to a user equipment (UE); receiving, by the positioning device, a SL reference signal configured according to the reference signal configuration request; and obtaining, by the positioning device, SL measurements based on the received SL reference signal.

In an implementation form of the second aspect, the reference signal configuration request comprises at least one of a first measurement report configuration, a configuration, a periodicity, or a number of repetitions.

In an implementation form of the second aspect, the reference signal configuration comprises at least one of a second measurement report configuration, a granted configuration, a periodicity, or a number of repetitions.

The second aspect and its implementation forms include the same advantages and preferred implementation manners (e.g., introduced by "preferably") as the first aspect and its implementation forms.

A third aspect of the present invention provides a radio resource controller (RRC), configured to obtain a reference signal configuration request, and determine a reference signal configuration based on at least the reference signal configuration request, wherein the RRC is further configured to determine the reference signal configuration to be at least one of a downlink (DL) reference signal configuration, an uplink (UL) reference signal configuration, or a sidelink (SL) reference signal configuration.

In other words, the RRC is generally configured to determine a DL, UL and SL reference signal configuration. That is, all those three types of reference signal configurations (DL, UL and SL) are supported by the RRC at a same time, however only one of them is determined to be the reference signal configuration based on the reference signal configuration request.

A fourth aspect of the present invention provides a method for operating a radio resource controller (RRC), the method comprising the steps of obtaining, by the RRC, a reference signal configuration request, and determining, by the RRC, a reference signal configuration based on at least the reference signal configuration request, wherein the method further comprises determining, by the RRC, the reference signal configuration to be at least one of a downlink (DL) reference signal configuration, an uplink (UL) reference signal configuration, or a sidelink (SL) reference signal configuration.

A fifth aspect of the present invention provides a system for position calculation of a mobile device, comprising a positioning device according to the first aspect or any of its implementation forms, a radio resource controller (RRC), according to the third aspect or any of its implementation forms, and/or at least one user equipment (UE).

The fifth aspect and its implementation forms include the same advantages as the first aspect and its implementation forms and the third aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms of the present invention will be explained in the following description of specific embodiments in relation to the enclosed drawings, in which.

DETAILED DESCRIPTION OF EMBODIMENTS

Figure 1:
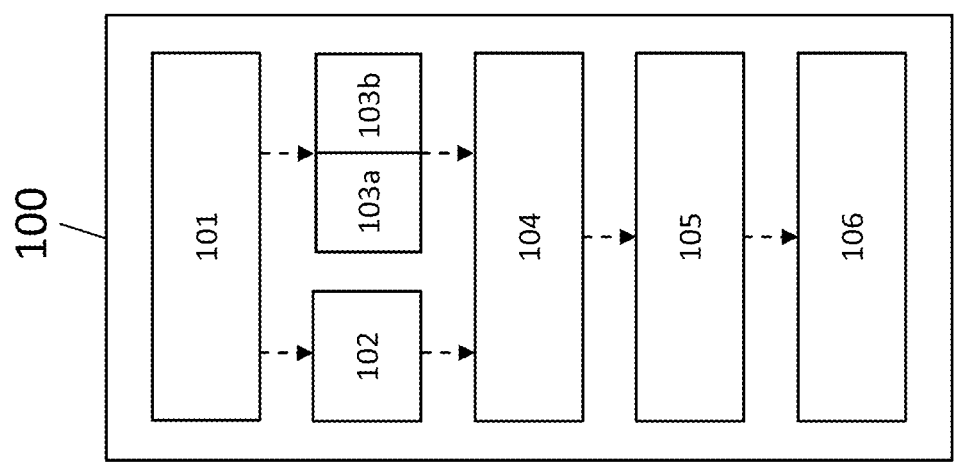
FIG. 1 shows a schematic view of a device according to an embodiment of the present invention.

FIG. 1 shows a positioning device 100 according to an embodiment of the present invention. The positioning device 100 is for calculating a position 106 of a mobile device.

As it is illustrated in FIG. 1, the positioning device 100 is configured to determine a measurement quality 102, and/or a reference signal type 103a and configuration 103b based on a positioning request 101. The positioning device 100 is also configured to determine a reference signal configuration request 104 based on at least the measurement quality 102, and/or the reference signal type 103a and configuration 103b, to obtain a measurement result 105 based on a reference signal configured according to the reference signal configuration request 104, and to calculate the position 106 based on at least the measurement result 105.

The reference signal type 103a can at least be one of a DL reference signal type, an UL reference signal type, or a SL reference signal type.

In the present disclosure, the positioning device 100 can also be called positioning engine or "PosEng". The reference signal may also be called "RefSig". A reference signal transmitter may be called "RefSig TX", and a reference signal receiver may be called "RefSig RX". The positioning request 101 may also be called a location request.

Generally, each of FIG. 2 to FIG. 20 includes the function and features of the positioning device 100 as described in FIG. 1. To this end, similar features are labelled with similar reference signs.

Figure 2:
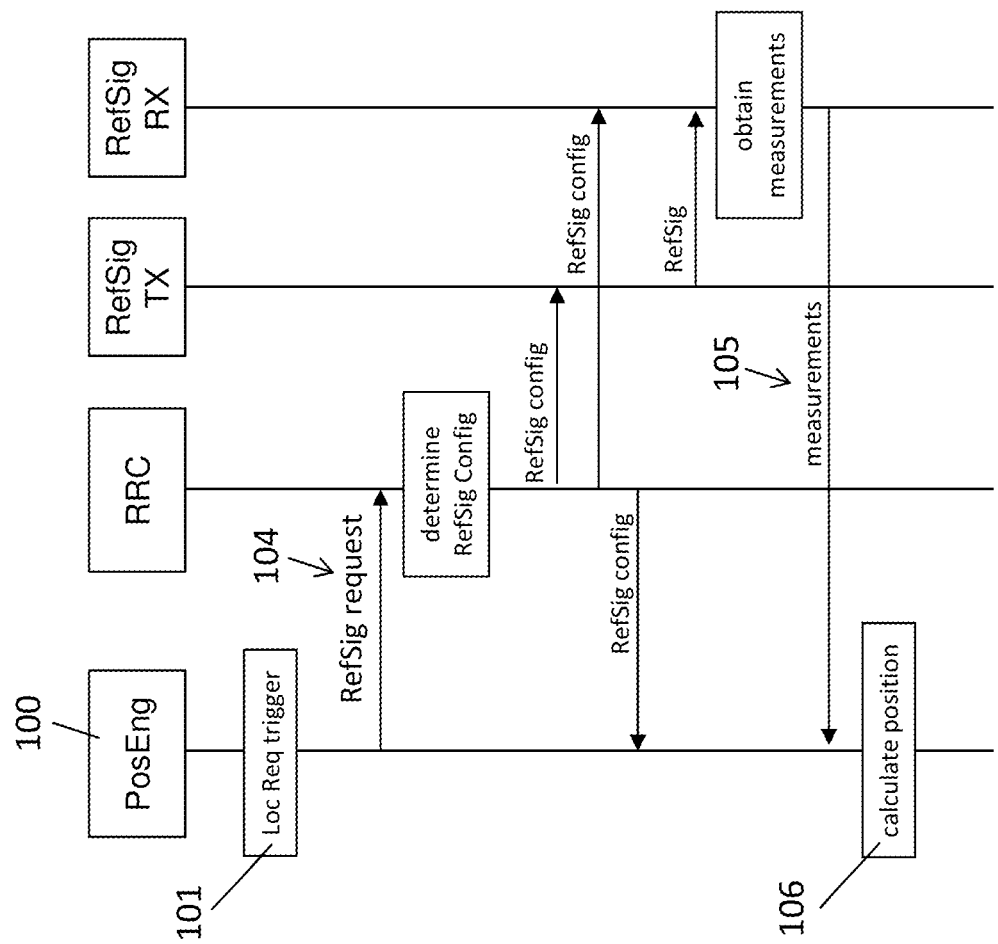
FIG. 2 shows a schematic view of an operating manner of the device according to an embodiment of the present invention.

FIG. 2 shows a schematic view of an operating manner of the positioning device 100. In particular, a generic signaling procedure for RAT-dependent positioning is depicted in FIG. 2. The procedure can be characterized by the following steps:

1. Triggered by a location request, the PosEng determines the desired measurements type and accuracy (e.g., the measurement quality 102), as well as the RefSig required for obtaining the desired measurements.
2. The PosEng sends a message (i.e., the signal configuration request—RefSig request 104) to a RRC or multiple RRCs, requesting the desired type and configuration of the RefSig.
3. The RRC determines if/how the desired RefSig can be allocated and informs the PosEng, RefSig TX, and RefSig RX about the granted RefSig configuration.
4. The RefSig TX transmits the RefSig to the RefSig RX.
5. The RefSig RX obtains measurements (i.e., the measurement result 105) based on the received RefSig and sends the measurements to the PosEng.
6. The PosEng calculates a position 106 based at least on the received measurements (e.g., the measurement result 105).

Each of the four functional blocks (i.e. the PosEng (that is, the positioning device 100), the RRC, the RefSig TX, and the RefSig RX) presented in FIG. 2 may be deployed/implemented in a different network entity, e.g., in the CN, in the radio access network (RAN), in a target UE or in a second UE. The following table gives an overview of system design options where the signaling procedure in FIG. 2 can be applied.

| PosEng | RRC | RefSig TX | RefSig RX | Scenario |
|---|---|---|---|---|
| Target UE | RAN | BS/TRP | Target UE | 1.1) Downlink-assisted UE-based |
| Target UE | RAN | Target UE | BS/TRP | 1.2) Uplink-assisted UE-based |
| Location server | RAN | UE TX | UE RX | 2.1) Sidelink-assisted network-based (CN-based) |
| RAN | RAN | UE TX | UE RX | 2.2) Sidelink-assisted network-based (RAN-based) |
| Target UE | RAN | Assisting UE | Target UE | 3.1) Sidelink-assisted UE-based |
| Master UE | RAN | Target UE | Master UE | 3.2) Sidelink-assisted UE-based |
| Target UE | Target UE | Assisting UE | Target UE | 4.1) Sidelink-assisted UE-based |
| Target UE | Assisting UE | Assisting UE | Target UE | 4.2) Sidelink-assisted UE-based |
| Master UE | Master UE | Target UE | Master UE | 4.3) Sidelink-assisted UE-based |

Each of these design options is going to be described in the following scenarios.

1.1 Downlink-Assisted UE-Based Positioning

Figure 3:
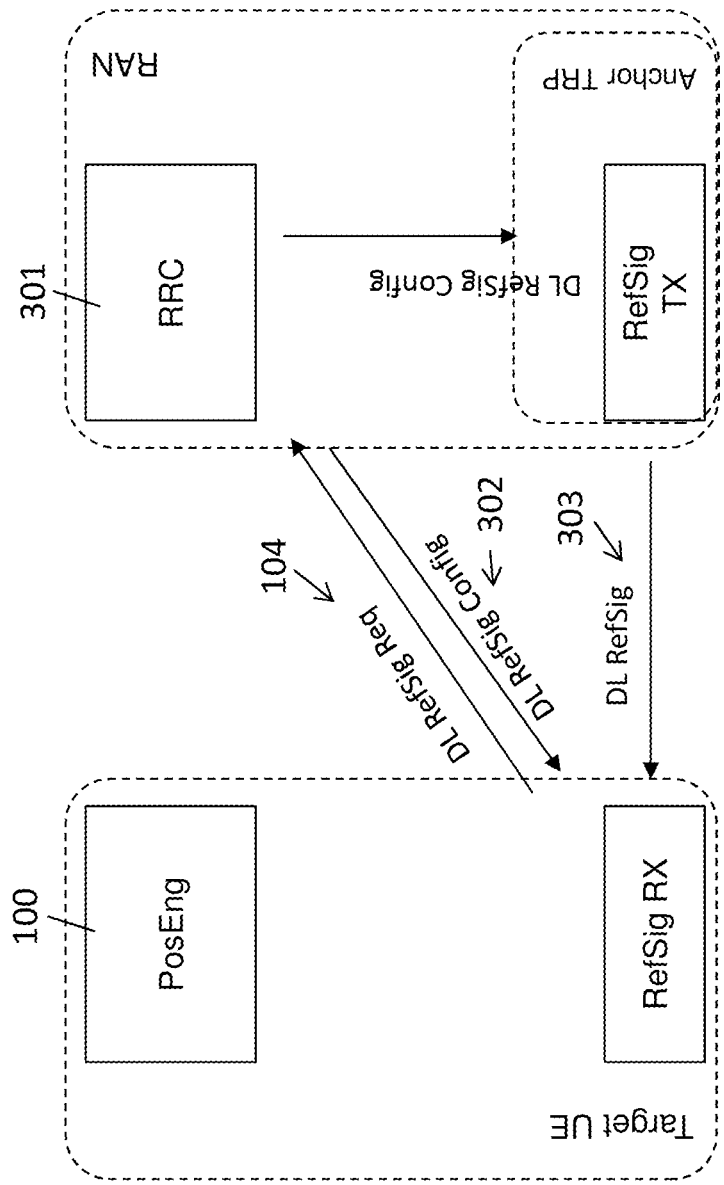
FIG. 3 shows a schematic view of another operating manner of the device according to an embodiment of the present invention.

FIG. 3 shows a schematic view of an operating manner of the positioning device 100, which can also be called downlink-assisted UE-based positioning. This manner refers to a system design where a target UE obtains radio signal measurements in downlink transmission and calculates its own position based on at least these RAT-based measurements.

As shown in FIG. 3, it is assumed that the positioning engine (i.e. the positioning device 100) is located in a target UE, and that the RAN controls the radio resource, therefore allocates a downlink radio resource for RAT-based measurements. The network provides the target UE positioning assistance in terms of assistance information and radio resource. Therefore, a charging policy may be applied.

Figure 4:
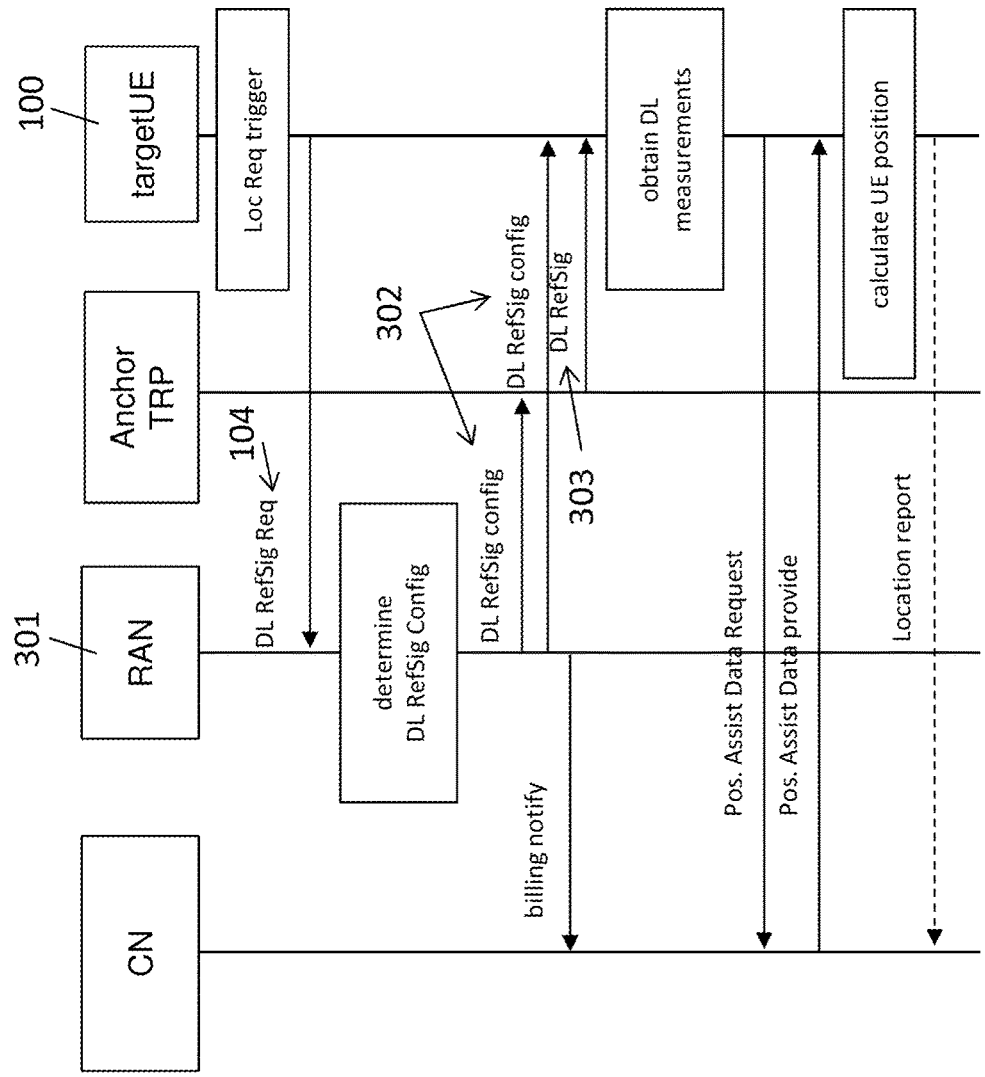
FIG. 4 shows a schematic view of another operating manner of the device according to an embodiment of the present invention.

FIG. 4 shows an example signaling procedure which is used for downlink-assisted UE-based positioning and which can be performed by the positioning device 100. The steps of this procedure are the following:

1. A target UE (i.e., the positioning device 100) is triggered by a location request. This location request may be generated by a local application in the UE or forwarded to the UE by another entity in the network. The location request may indicate a required positioning Quality of Service (QoS). Based on the positioning QoS and capability of the RAN/UE, the target UE determines whether and which downlink radio measurements are desired, then further determines the RefSig required for obtaining the desired measurement quality 102.
2. The target UE sends a message (i.e. the reference signal configuration request 104) to the RAN or multiple RAN elements, requesting the desired type and configuration of the downlink RefSig 303. This RefSig request may consist of a type or features of the RefSig, such as a bandwidth, a number of repetitions, a period, a direction in the global coordinate system, or any geographical area description (as e.g., described in TS 23.032).
3. The RAN 301 or each RAN element, which implements a RRC, determines if/how the desired downlink RefSig 303 can be allocated and informs the target UE and the involved transmission/reception points (TRPs) (e.g., the RefSig TX and the RefSig RX) about the granted RefSig configuration 302. Given that there is a radio resource consumed, the RAN may inform the corresponding function block in the CN so that a billing policy can be applied.
4. The involved TRPs transmit a RefSig 303 to the target UE in the downlink according to the RefSig configuration 302, serving as the anchors for positioning.
5. The target UE obtains radio signal measurements based on the RefSig 303 received from the anchor TRPs. In addition, the target UE may request positioning assistance data from a location server in CN.
6. The target UE calculates its position based on at least the radio signal measurements (i.e. the measurement result 105) and/or assistance data provided by the network. The positioning method may be indicated by the network. As an alternative, the UE may choose any positioning method to fuse any kinds of measurements for its own benefits. Optionally, the target UE reports the location update to the location server in CN.

1.2 Uplink-Assisted UE-Based Positioning

Figure 5:
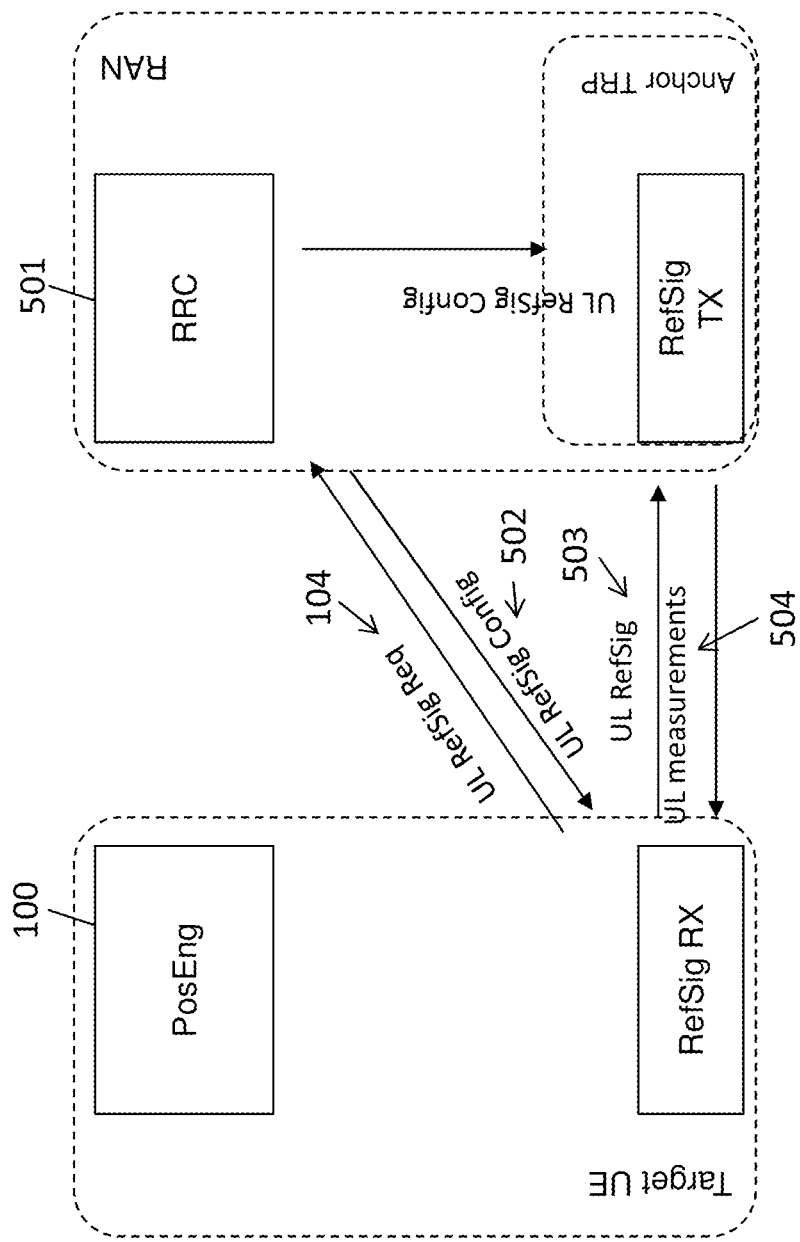
FIG. 5 shows a schematic view of another operating manner of the device according to an embodiment of the present invention.

FIG. 5 shows a schematic view of an operating manner of the positioning device 100, which can also be called uplink-assisted UE-based positioning. This option refers to a system design where a target UE requests the uplink radio signal measurements and calculates its own position based on at least these RAT-based measurements.

As shown in FIG. 5, it is assumed that the positioning engine 100 is located in the target UE, that the RAN controls the radio resource, therefore allocates uplink radio resources for RAT-based measurements, and that the network provides the target UE positioning assistance in terms of assistance information and radio resource, therefore a charging policy may be applied.

Figure 6:
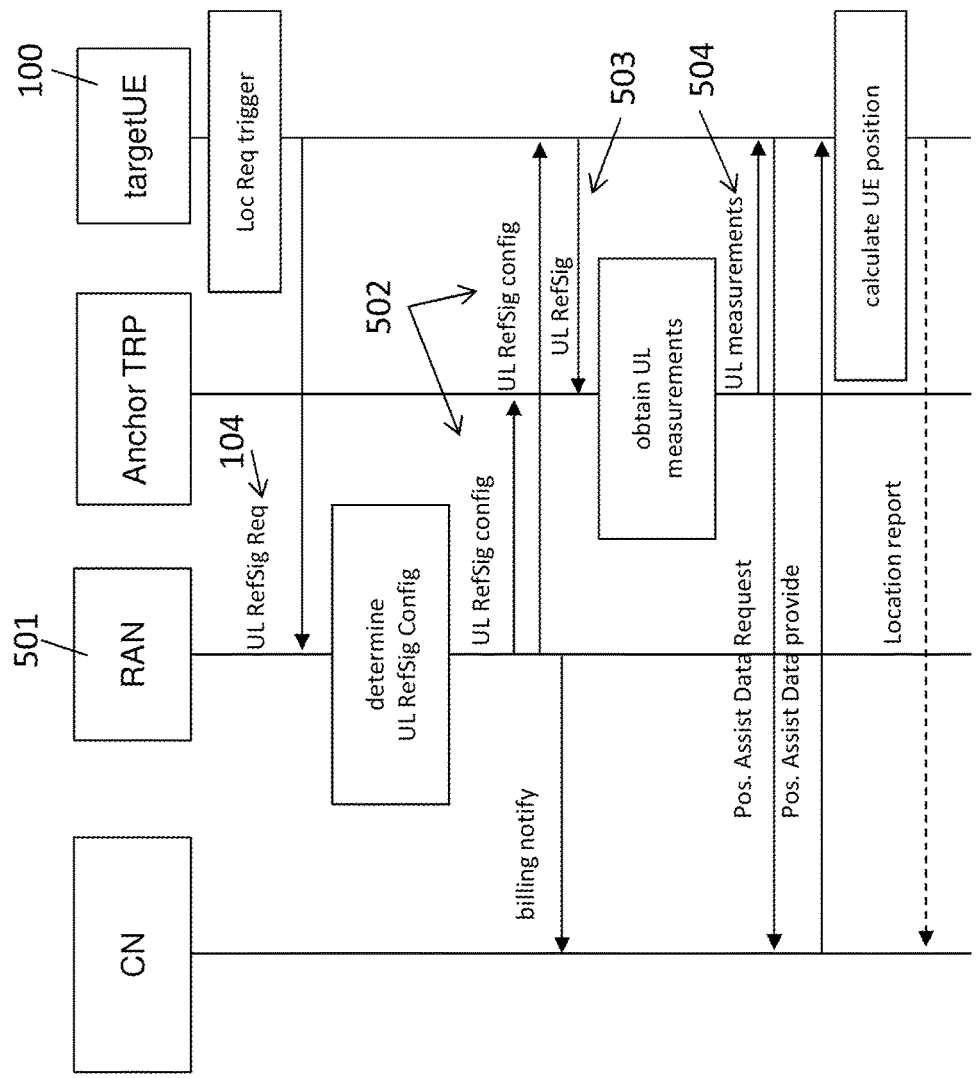
FIG. 6 shows a schematic view of another operating manner of the device according to an embodiment of the present invention.

FIG. 6 shows an example signaling procedure which is used for uplink-assisted UE-based positioning and which can be performed by the positioning device 100. The steps of this procedure are the following:
1. The target UE (i.e. the positioning engine 100) is triggered by a location request. This location request may be generated by a local application in the UE or forwarded by another entity in the network. The location request may indicate the required positioning QoS. Based on the positioning QoS and capability of RAN/UE, the target UE determines whether and which uplink radio measurements are desired, then further determines the RefSig required for obtaining the desired measurement quality 102.
2. The target UE sends a message 104 to the RAN or multiple RAN elements, requesting the desired type and configuration of the uplink RefSig 503. This RefSig request 104 may consist of type or features of the RefSig 503, such as a bandwidth, a number of repetitions, a period, a direction in the global coordinate system, or any geographical area description (e.g. as described in TS 23.032).
3. The RAN or each RAN elements, which implement the RRC, determines if/how the desired uplink RefSig 503 can be allocated and informs the target UE and the involved TRPs about the granted RefSig configuration 502. Given that there is a radio resource consumed, the RAN may inform the corresponding function block in the CN so that billing policy can be applied.
4. The target UE transmits the RefSig 503 to the involved TRPs in the uplink according to the RefSig configuration 502. The TRPs serve as the anchors for positioning.
5. The anchor TRPs or the RAN obtains radio signal measurements 504 based on the RefSig 503 received from the target UE. These measurements are conveyed to the target UE. In addition, the target UE may request positioning assistance data from the location server in CN.
6. The target UE calculates its position based on at least the uplink radio signal measurements 504 received and/or assistance data provided by the network. The positioning method may be indicated by the network. As an alternative, the UE may choose any positioning method to fuse any kinds of measurements for its own benefits. Optionally, the target UE reports the location update to the location server in CN.

2.1 Sidelink-Assisted Network Based Positioning (CN-Based)

Figure 7:
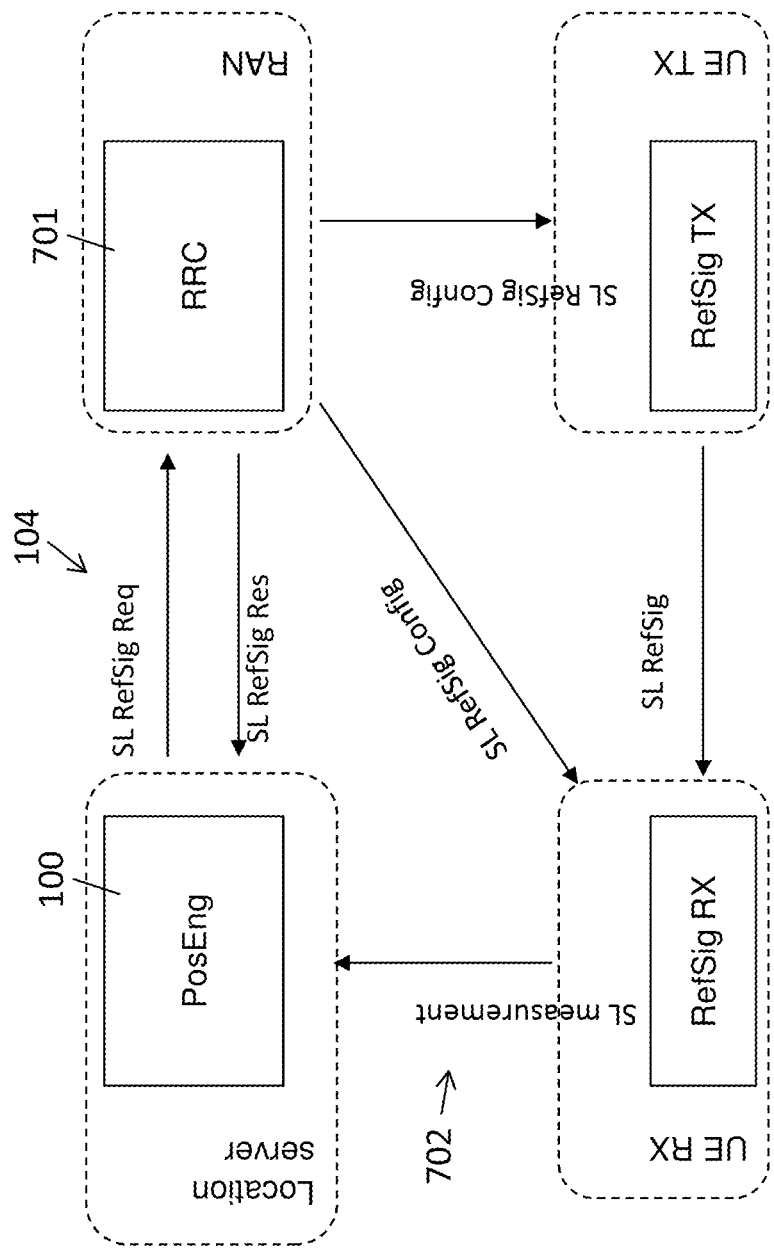
FIG. 7 shows a schematic view of another operating manner of the device according to an embodiment of the present invention.

FIG. 7 shows a schematic view of an operating manner of the positioning device 100, which can also be called sidelink-assisted network based positioning (CN-based). This option refers to a system design where a location server in the CN or in a cloud collects any type of measurement and calculates the target UE position. The aim is to include sidelink measurements in addition to the prior-art types of measurements.

As shown in FIG. 7, it is assumed that the positioning engine 100 is implemented in the location server in CN or in the cloud. Further, the RAN controls the sidelink radio resources, therefore allocates sidelink radio resources for RAT-based measurements. Also the UEs support sidelink transmission and radio signal measurements.

Figure 8:
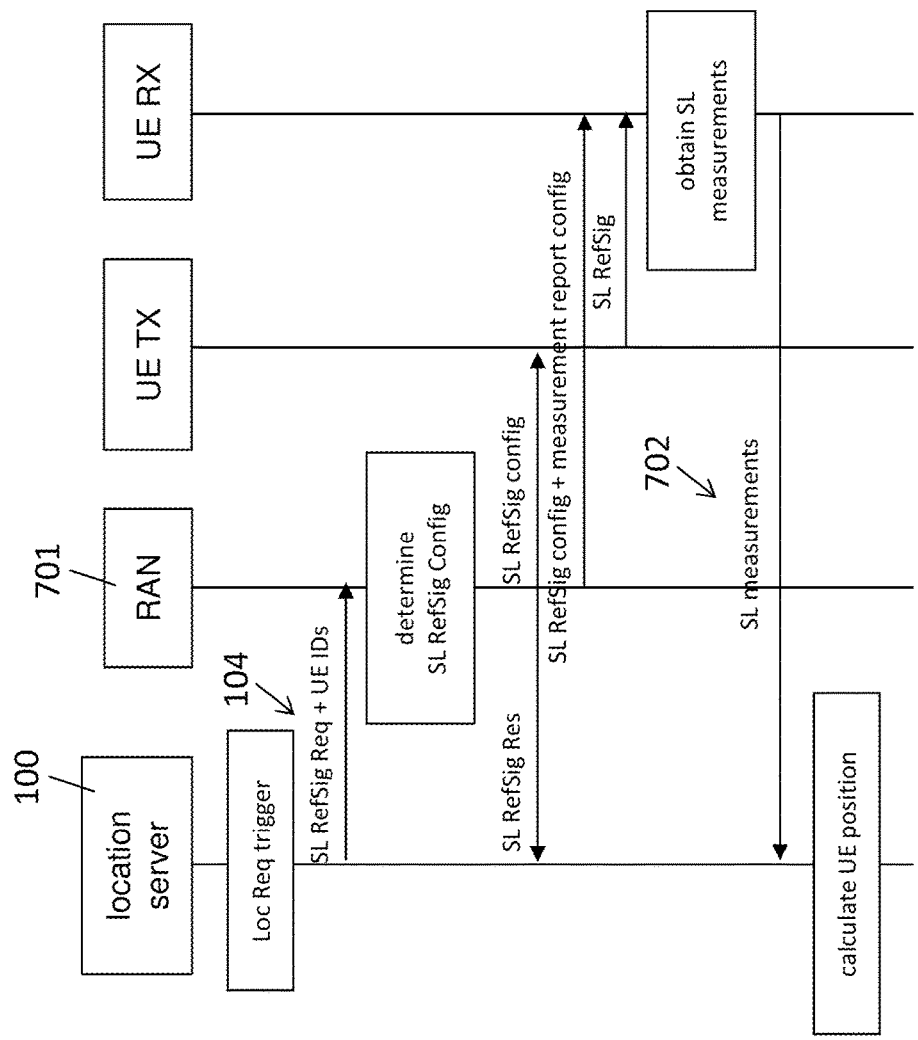
FIG. 8 shows a schematic view of another operating manner of the device according to an embodiment of the present invention.

FIG. 8 shows an example signaling procedure which is used for sidelink-assisted network based positioning and which can be performed by the positioning device 100. The steps of this procedure are the following:
1. The location server (i.e. the positioning device 100) receives a location request from a location services (LCS) client, requesting location of a target UE. The location request may indicate the required LCS quality of service (QoS). Based on the LCS QoS and a capability of the RAN/UE, the location server determines whether and which sidelink radio measurements are desired, then further determines which UEs are to be involved and which sidelink RefSig is required for obtaining the desired measurement quality 102. The target UE may serve as either RefSig TX or RefSig RX theoretically. However, the one with desired measurement capability should be chosen as the RefSig RX.
2. The location server sends a message 104 to the RAN 701 or multiple RAN elements, indicating the identities of the involved UE and requesting the desired type and configuration of sidelink RefSig. This RefSig request 104 may consist of type or features of the RefSig, such as a bandwidth, a number of repetitions, a period, a direction in the global coordinate system, or any geographical area description (e.g., as described in TS 23.032).
3. The RAN 701, given the sidelink radio resource that is available, determines if/how the desired sidelink RefSig can be allocated for the involved UEs, then informs the UEs and the location server about the granted RefSig configuration. The RAN also indicates the UE RX which type of sidelink measurements to acquire.
4. The UE which is assigned as RefSig TX transmits the RefSig in the sidelink according to the RefSig configuration.
5. The UE RX obtains the radio signal measurements 702 based on the sidelink RefSig received. The UE RX sends a message to the location server, containing the sidelink measurements 702.
6. The location server calculates the target UE's position based on at least the sidelink radio signal measurements 702.

2.2 Sidelink-Assisted Network-Based Positioning (RAN-Based)

Figure 9:
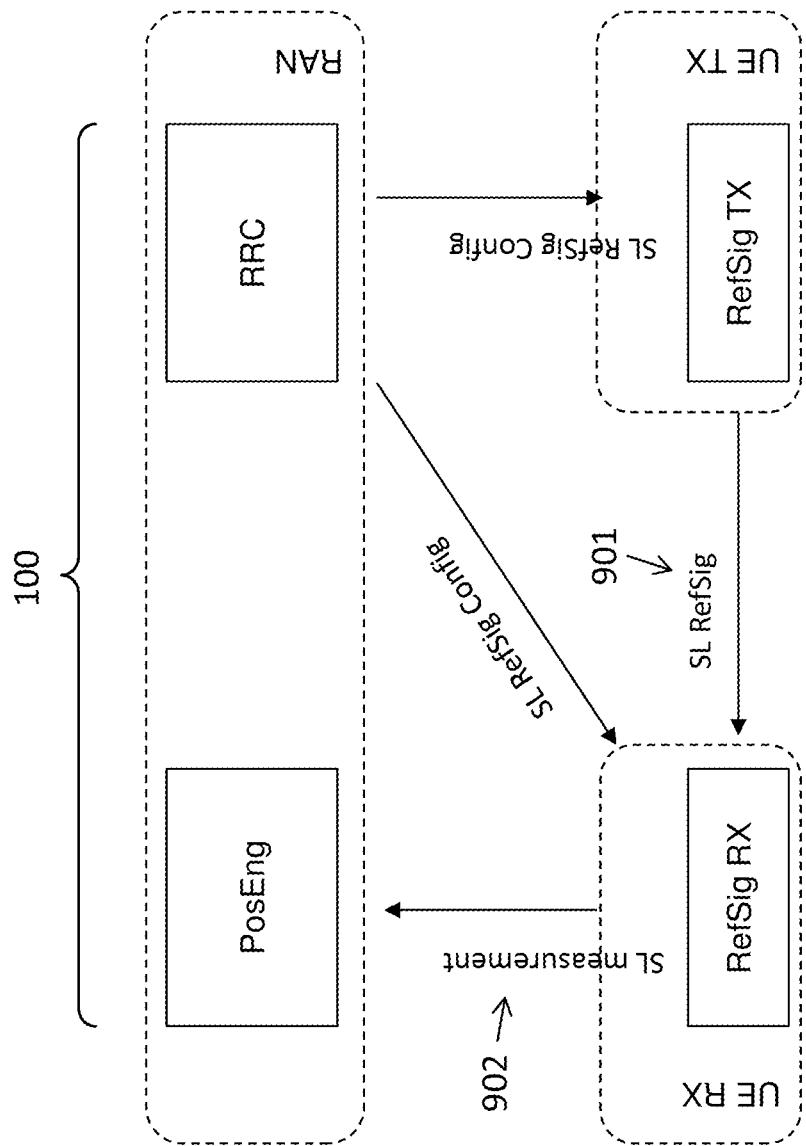
FIG. 9 shows a schematic view of another operating manner of the device according to an embodiment of the present invention.

FIG. 9 shows a schematic view of an operating manner of the positioning device 100, which can also be called sidelink-assisted network-based positioning (RAN-based). This option refers to a system design where a location server function is located in the RAN or in any entity associated with the RAN. The aim is to allow the location server function to obtain sidelink measurements.

As shown in FIG. 9, it is assumed that the positioning engine 100 is implemented in the RAN or in any entity associated with the RAN, such as a base station or a baseband unit. It is also assumed that the RAN controls the sidelink radio resource, therefore allocates sidelink radio resources for RAT-based measurements. Also, it is assumed that the UEs support sidelink transmission and radio signal measurements.

Figure 10:
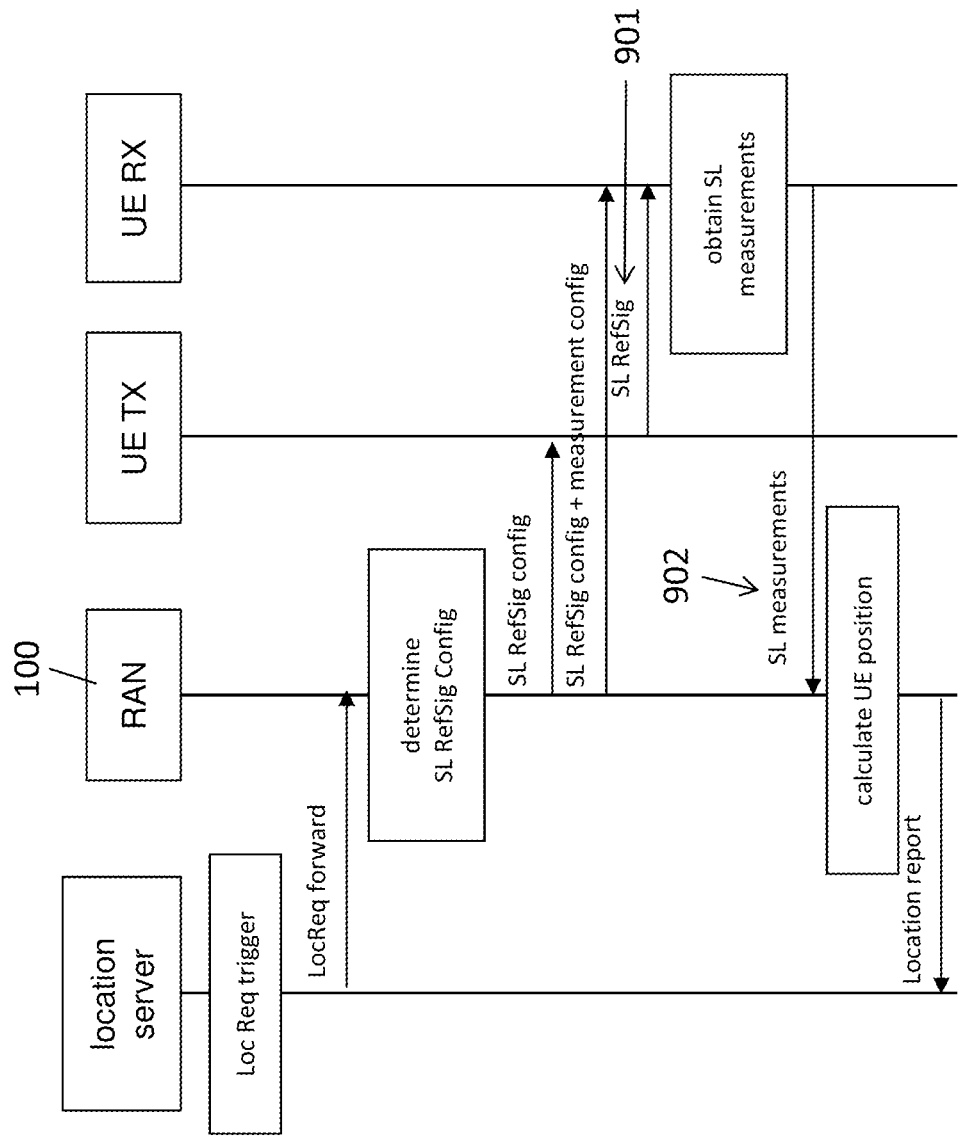
FIG. 10 shows a schematic view of another operating manner of the device according to an embodiment of the present invention.

FIG. 10 shows an example signaling procedure which is used for sidelink-assisted network-based positioning (RAN-based) and which can be performed by the positioning device 100. The steps of this procedure are the following:
1. The location server receives a location request from a LCS client and forwards it to a location server function in RAN (i.e. the positioning device 100). The location request may indicate the required LCS QoS. Based on the LCS QoS and the capability of the RAN/UE, the location server function in the RAN determines whether and which sidelink radio measurements are desired, then further determines which UEs to be involved and which sidelink RefSig is required for obtaining the desired measurement quality 102. The target UE may serve as either RefSig TX or RefSig RX theoretically. However, the one with desired measurement capability should be chosen as the RefSig RX.
2. Given the sidelink radio resource available, RAN determines if/how the desired sidelink RefSig 901 can be allocated for the involved UEs, then informs the UEs about the granted RefSig configuration. The RAN also indicates the UE RX which type of sidelink measurements to acquire.
3. The UE which is assigned as RefSig TX transmits RefSig 901 in the sidelink according to the RefSig configuration.
4. The UE RX obtains the radio signal measurements 902 based on the sidelink RefSig 901 received. The UE RX sends a message to the location server function in RAN, containing the sidelink measurements 902.
5. The location server function calculates the target UE's position based on at least the sidelink radio signal measurements 902. Optionally, the target UE location is reported to the location server in CN.

3.1 Sidelink-Assisted UE-Based Positioning (PosEng at Target UE)

Figure 11:
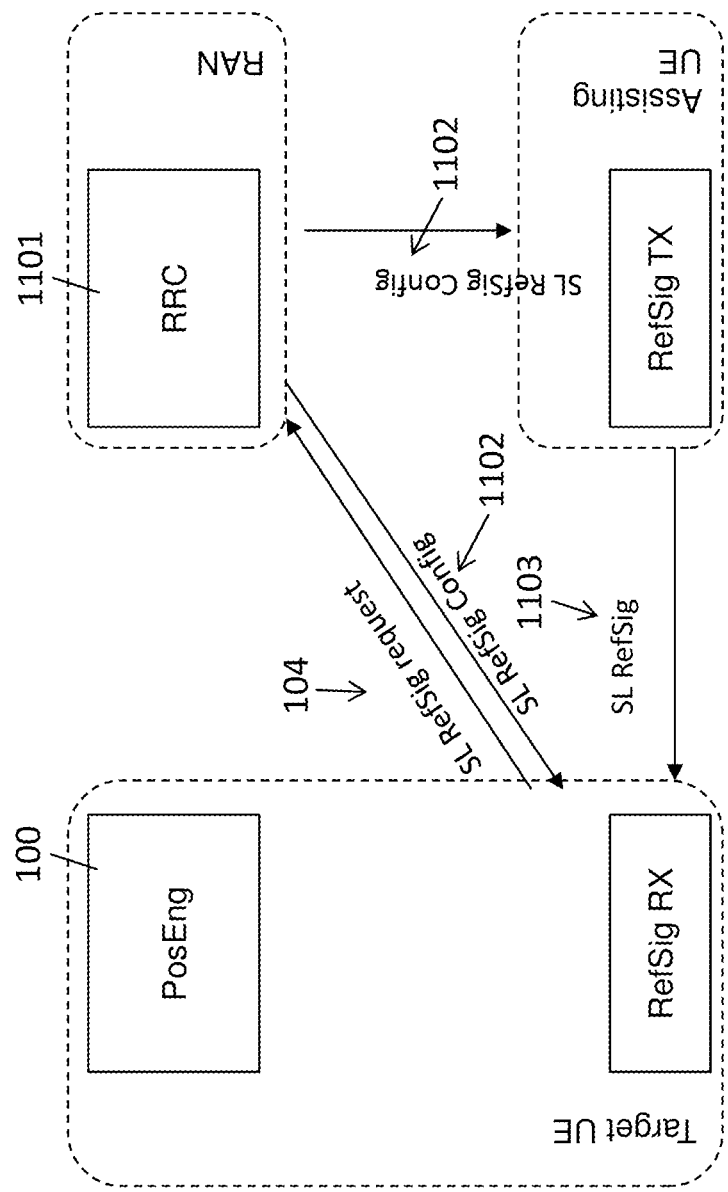
FIG. 11 shows a schematic view of another operating manner of the device according to an embodiment of the present invention.

FIG. 11 shows a schematic view of an operating manner of the positioning device 100, which can also be called sidelink-assisted UE-based Positioning (PosEng 100 at target UE). This option refers to a system design where the target UE obtains the radio signal measurements in the sidelink and calculates its own position based on at least the sidelink-based measurements.

As shown in FIG. 11, it is assumed that the positioning engine 100 is located in the target UE, that the target UE supports sidelink measurements, and that the sidelink radio resource is controlled by the RAN.

Figure 12:
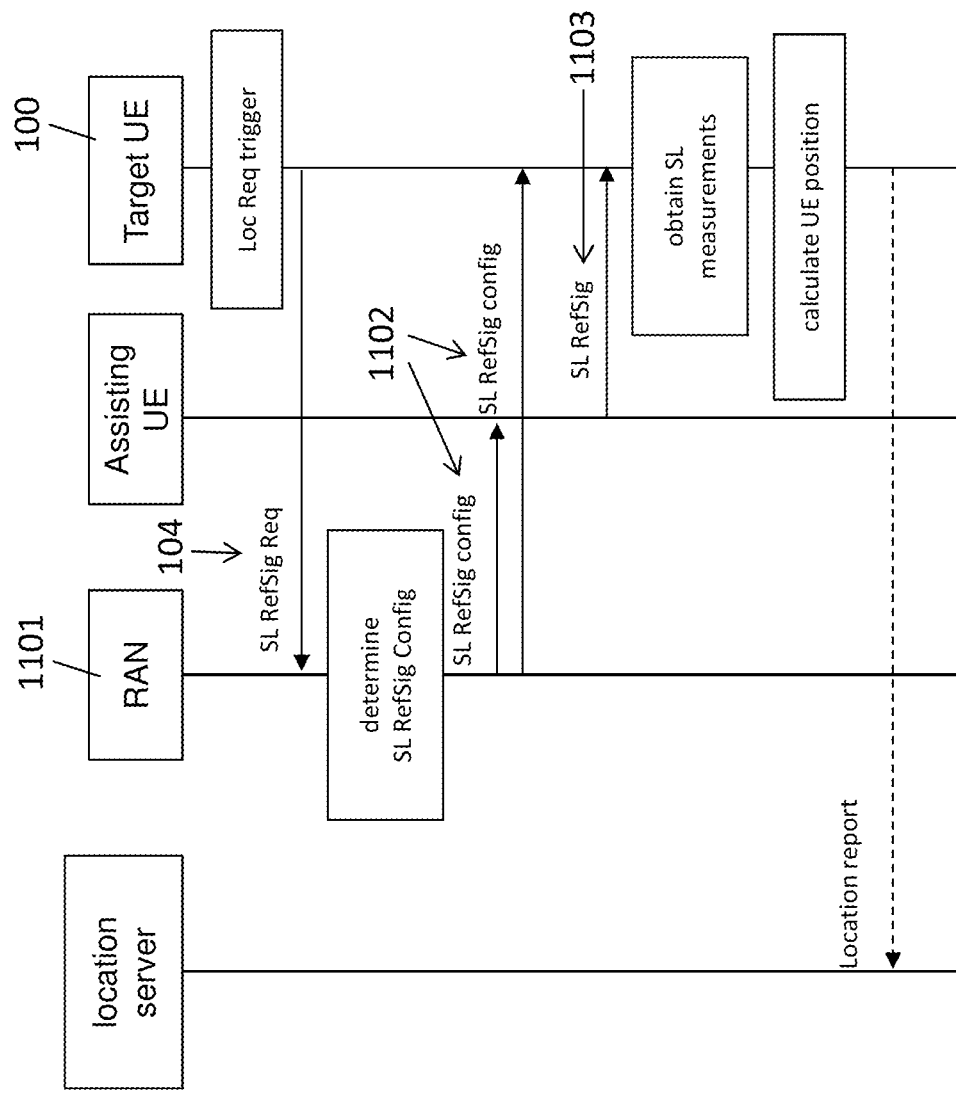
FIG. 12 shows a schematic view of another operating manner of the device according to an embodiment of the present invention.

FIG. 12 shows an example signaling procedure which is used for sidelink-assisted UE-based Positioning (PosEng at target UE) and which can be performed by the positioning device 100. The steps of this procedure are the following:
1. The target UE (i.e. the positioning device 100) is triggered by a location request. This location request may be generated by a local application in the UE or forwarded by another entity in the network to the UE. The location request may indicate the required positioning Quality of Service (QoS). Based on the positioning QoS and capability of RAN/UE, the target UE determines whether and which sidelink radio measurements are desired, then further determines the RefSig required for obtaining the desired measurement quality 102.
2. The target UE sends a message 104 to the RAN 1101, requesting the desired sidelink RefSig 1103. This RefSig request 104 may consist of type or features of the RefSig 1103, such as bandwidth, number of repetitions, period, spatial characteristics such as direction, or any geographical area description. The target UE may discover potential assisting UEs and contain the assisting UEs' identities in the RefSig request.
3. RAN 1101, as a RRC, determines if/how the desired sidelink RefSig 1103 can be allocated. As an alternative, the RAN 1101 may determine the assisting UEs to be activated as RefSig TXs. RAN further informs the target UE and the involved assisting UEs about the granted RefSig configuration 1102. Since there is a radio resource consumed, the RAN may inform the corresponding function block in the CN so that a billing policy can be applied.
4. The involved assisting UEs transmit the RefSig 1103 to the target UE over sidelink according to the RefSig configuration 1102.
5. The target UE obtains radio signal measurements based on the RefSig 1103 received from the assisting UEs.
6. The target UE calculates its position based on at least the radio signal measurements. The positioning method may be indicated by the network. As an alternative, the UE may choose any positioning method to fuse any kinds of measurements for its own benefits. Optionally, the target UE reports the location update to the location server in CN.

3.2 Sidelink-Assisted UE-Based Positioning (PosEng at a Second UE)

Figure 13:
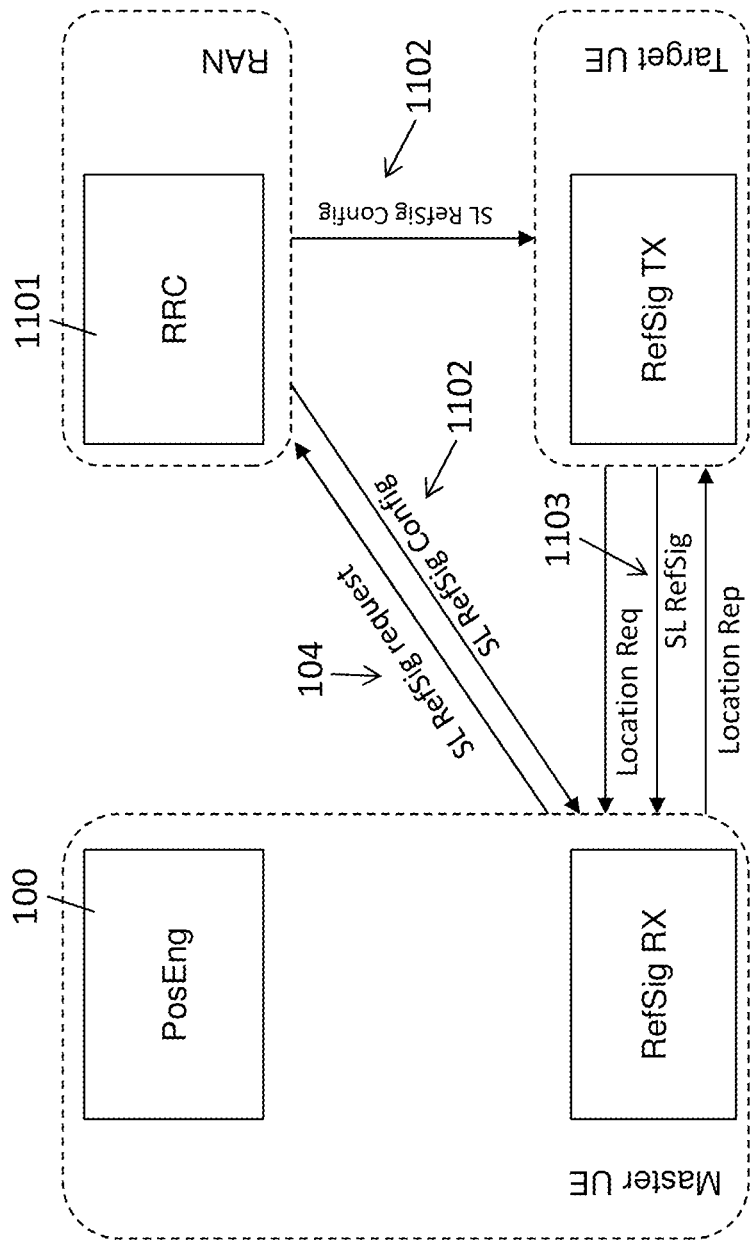
FIG. 13 shows a schematic view of another operating manner of the device according to an embodiment of the present invention.

FIG. 13 shows a schematic view of an operating manner of the positioning device 100, which can also be called sidelink-assisted UE-based positioning (PosEng at a second UE). This option refers to a system design where a second UE with location server function, named a Master UE, obtains the radio signal measurements in the sidelink and calculates the target UE's position based on at least the sidelink-based measurements. Here, the target UE cannot calculate the position, thus requests the Master UE. The Master UE decides which reference signal to be used.

As shown in FIG. 13, it is assumed that the positioning engine is located in the Master UE, that the Master UE collects any type or measurements and calculates the target UE's position based on the measurements, that the Master UE supports sidelink measurements, and that the sidelink radio resource is controlled by the RAN.

Figure 14:
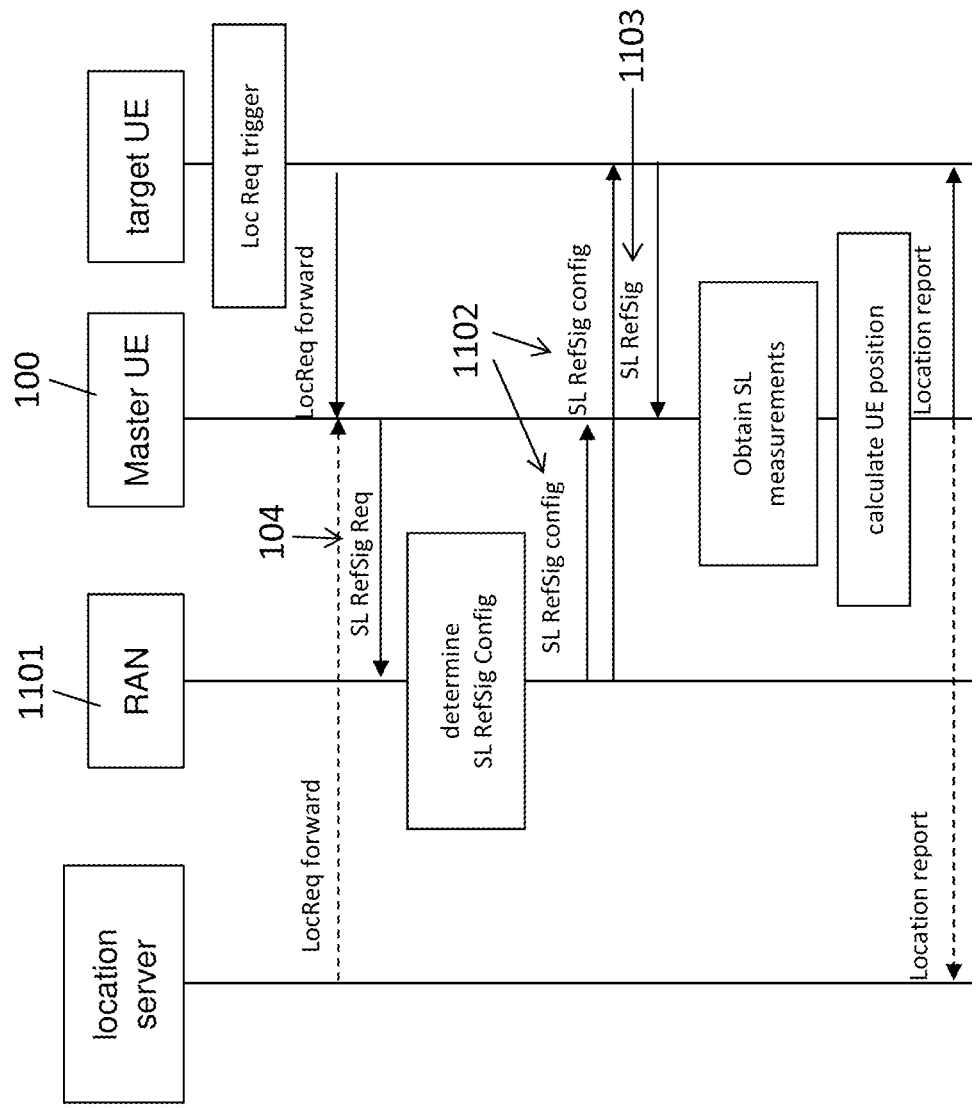
FIG. 14 shows a schematic view of another operating manner of the device according to an embodiment of the present invention.

FIG. 14 shows an example signaling procedure which is used for sidelink-assisted UE-based Positioning (PosEng at a second UE) and which can be performed by the positioning device 100. The steps of this procedure are the following:

1. The Master UE (i.e., the positioning device 100) receives a location request. This location request may be generated by a local application in the target UE or forwarded by another entity in the network to the Master UE. The location request may indicate the required positioning QoS. Based on the positioning QoS and capability of the RAN/UE, the Master UE determines whether and which sidelink radio measurements are desired, then further determines the RefSig required for obtaining the desired measurement quality 102.
2. The Master UE sends a message 104 to RAN 1101, requesting the desired sidelink RefSig 1103. This RefSig request 104 may consist of type or features of the RefSig 1103, such as a bandwidth, a number of repetitions, a period, spatial characteristics such as a direction, or any geographical area description (e.g., as described in TS 23.032). It is assumed that the sidelink connection between the Master UE and the target UE is established till this step.
3. RAN 1101, as a RRC, determines if/how the desired sidelink RefSig 1103 can be allocated. RAN further informs the target UE and the Master UEs about the granted RefSig configuration 1102. Since there is radio resource consumed, the RAN may inform the corresponding function block in CN so that billing policy can be applied.
4. The target UE transmits RefSig 1103 to the Master UE over sidelink according to the RefSig configuration 1102.
5. The Master UE obtains radio signal measurements based on the RefSig 1103 received from the target UE.
6. The Master UE calculates its position based on at least the radio signal measurements. The positioning method may be indicated by the network. As an alternative, the Master UE may choose any positioning method to fuse any kinds of measurements. The Master UE provides location estimate to the target UE. Optionally, the Master UE reports the location update of the target UE to the location server in CN.

4.1 Sidelink-Assisted UE-Based Positioning (RRC at Target UE)

Figure 15:
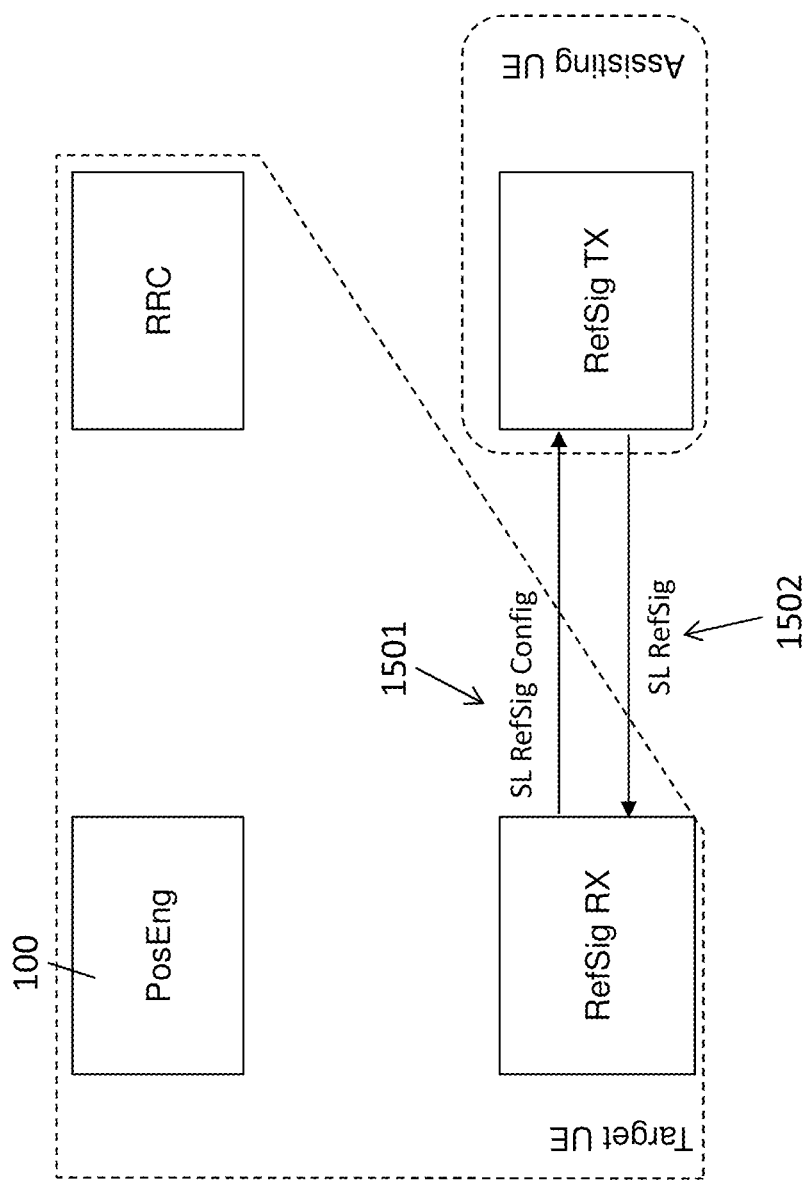
FIG. 15 shows a schematic view of another operating manner of the device according to an embodiment of the present invention.

FIG. 15 shows a schematic view of an operating manner of the positioning device 100, which can also be called sidelink-assisted UE-based positioning (RRC at target UE). This option refers to a system design where a target UE obtains radio signal measurements in the sidelink and calculates its own position based on at least the sidelink-based measurements.

As shown in FIG. 15, it is assumed that the positioning engine 100 is located in the target UE, that the sidelink radio resource is indirectly controlled by a RAN or out of the control of the RAN. Examples include using a resource pool and corresponding rules specified by the RAN for sidelink communication. However, the RAN is not involved in resource allocation for every single sidelink transmission. It is further assumed that the target UE takes control of the sidelink resource for reference signal transmission and supports sidelink measurements.

Figure 16:
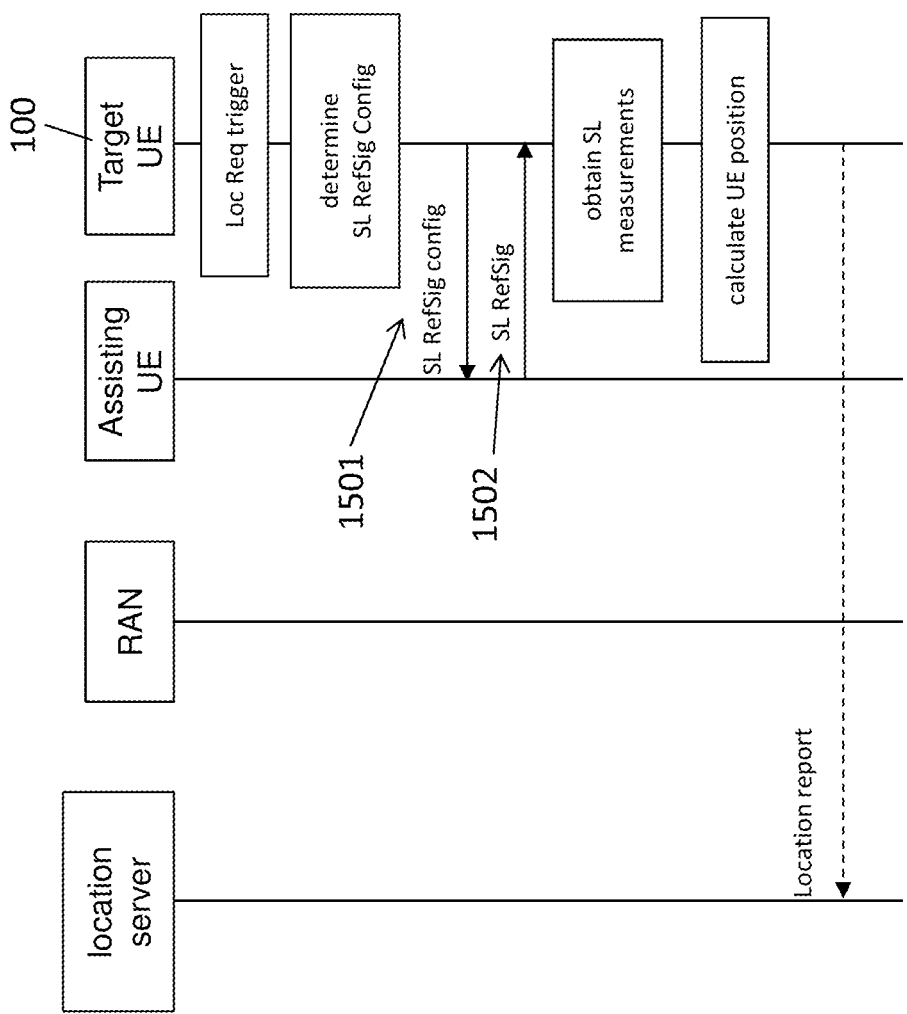
FIG. 16 shows a schematic view of another operating manner of the device according to an embodiment of the present invention.

FIG. 16 shows an example signaling procedure which is used for sidelink-assisted UE-based positioning (RRC at target UE) and which can be performed by the positioning device 100. The steps of this procedure are the following:

1. The target UE is triggered by a location request. This location request may be generated by a local application in the UE or forwarded by another entity in the network to the UE. The location request may indicate the required positioning QoS. Based on the positioning QoS and a capability of the RAN/UE, the target UE determines whether and which sidelink radio measurements are desired, then further determines the RefSig 1502 required for obtaining the desired measurement quality 102.
2. The target UE determines the sidelink RefSig configuration 1501. This RefSig configuration 1501 may consist of type or features of the RefSig 1502, such as resource allocation, number of repetitions, period, and spatial characteristics such as beam direction. The target UE may discover potential assisting UEs and contain the assisting UEs' identities in the RefSig request.
3. The target UE informs the target UE and the involved assisting UEs about the RefSig configuration 1501.
4. The involved assisting UEs transmit RefSig 1502 to the target UE over sidelink according to the RefSig configuration 1501.
5. The target UE obtains radio signal measurements based on the RefSig 1502 received from the assisting UEs.
6. The target UE calculates its position based on at least the sidelink radio signal measurements. The positioning method may be indicated by the network. As an alternative, the UE may choose any positioning method to fuse any kinds of measurements for its own benefits. If the location request is originated from the network, the target UE reports the location update to the location server in CN. Otherwise, the location report is optional.

4.2 Sidelink-Assisted UE-Based Positioning (RRC at Assisting UE)

Figure 17:
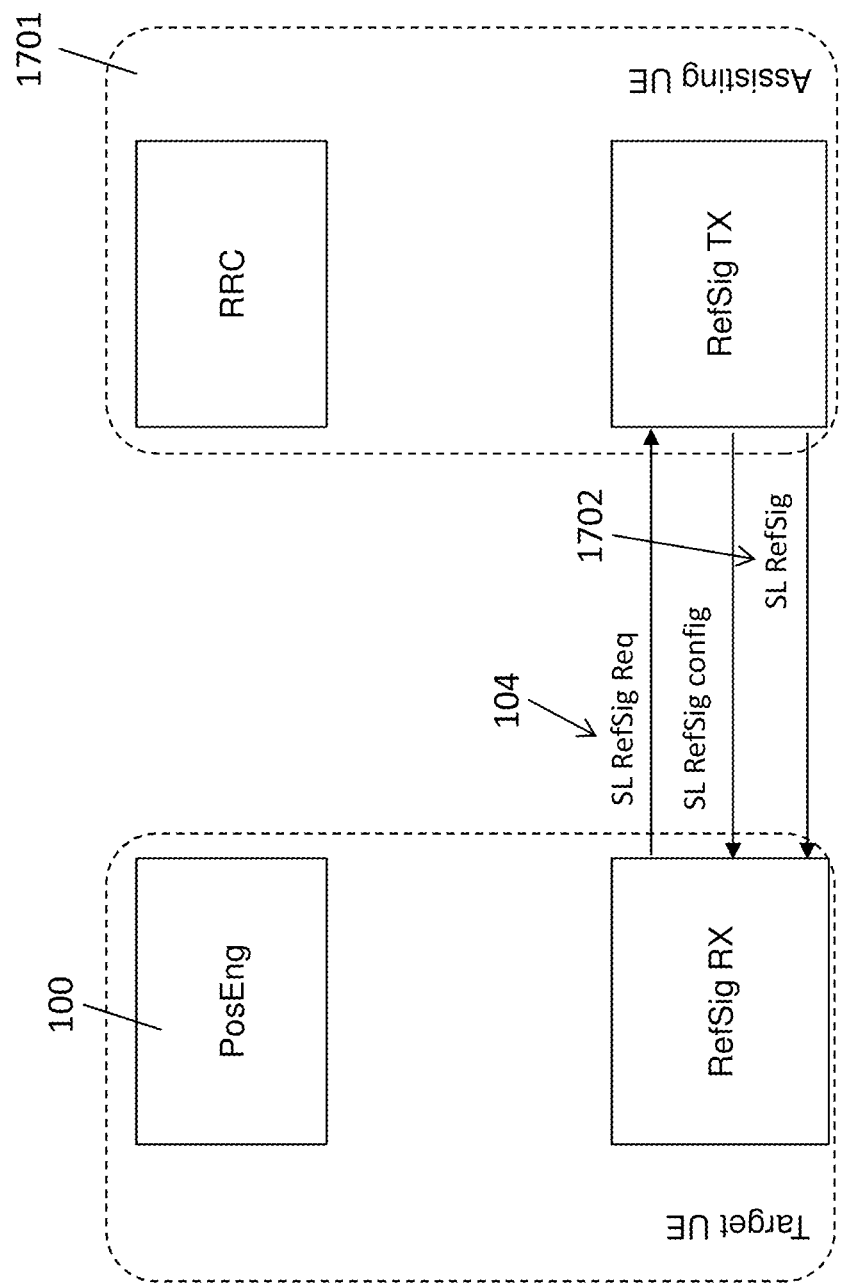
FIG. 17 shows a schematic view of another operating manner of the device according to an embodiment of the present invention.

FIG. 17 shows a schematic view of an operating manner of the positioning device 100, which can also be called sidelink-assisted UE-based positioning (RRC at assisting UE). This option refers to a system design where the target UE obtains the radio signal measurements in the sidelink and calculates its own position based on at least the sidelink-based measurements.

As shown in FIG. 17, it is assumed that the positioning engine is located in the target UE, that the sidelink radio resource is indirectly controlled by the RAN or out of the control of the RAN. Examples include using a resource pool and corresponding rules specified by the RAN for sidelink communication. However, RAN is not involved in resource allocation for every sidelink transmission. It is further assumed that the assisting UE takes control of the sidelink resource for reference signal transmission, and that the target UE supports sidelink measurements.

Figure 18:
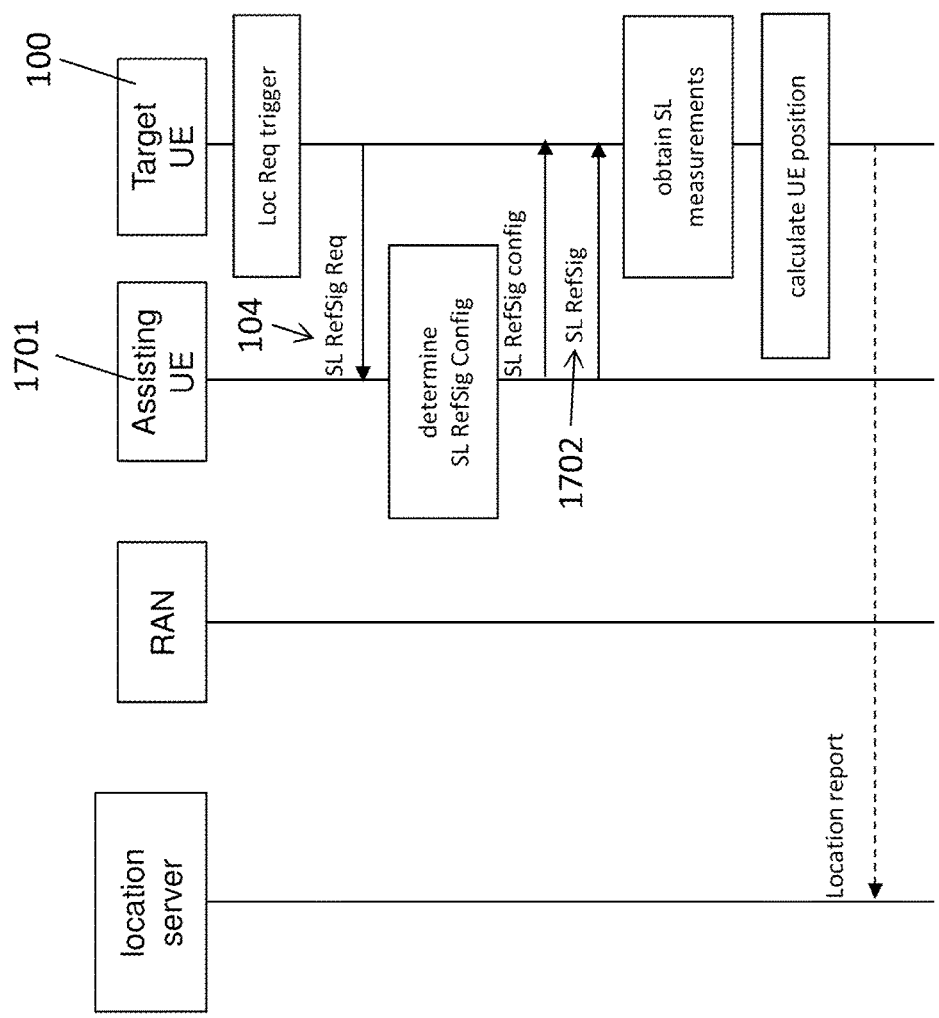
FIG. 18 shows a schematic view of another operating manner of the device according to an embodiment of the present invention.

FIG. 18 shows an example signaling procedure which is used for sidelink-assisted UE-based positioning (RRC at assisting UE) and which can be performed by the positioning device 100. The steps of this procedure are the following:

1. The target UE (i.e. the positioning device 100) is triggered by a location request. This location request may be generated by a local application in the UE or forwarded by another entity in the network to the UE. The location request may indicate the required positioning Quality of Service (QoS). Based on the positioning QoS and capability of RAN/UE, the target UE determines whether and which sidelink radio measurements are desired, then further determines the RefSig 1702 required for obtaining the desired measurement quality 102.

2. The target UE discover potential assisting UEs and sends a message 104 requesting the desired sidelink RefSig 1702. This RefSig request 104 may consist of type or features of the RefSig 1702, such as bandwidth, number of repetitions, period, spatial characteristics such as direction, or any geographical area description (e.g., as described in TS 23.032).
3. The assisting UE 1701 determines the sidelink RefSig configuration and informs the target UE about the RefSig configuration.
4. The assisting UE 1701 transmits sidelink RefSig 1702 to the target UE according to the RefSig configuration.
5. The target UE obtains radio signal measurements based on the RefSig 1702 received from the assisting UE.
6. The target UE calculates its position based on at least the sidelink radio signal measurements. The positioning method may be indicated by the network. As an alternative, the UE may choose any positioning method to fuse any kinds of measurements for its own benefits. If the location request is originated from the network, the target UE reports the location update to the location server in CN. Otherwise, the location report is optional.

4.3 Sidelink-Assisted UE-Based Positioning (RRC and PosEng at a Second UE)

Figure 19:
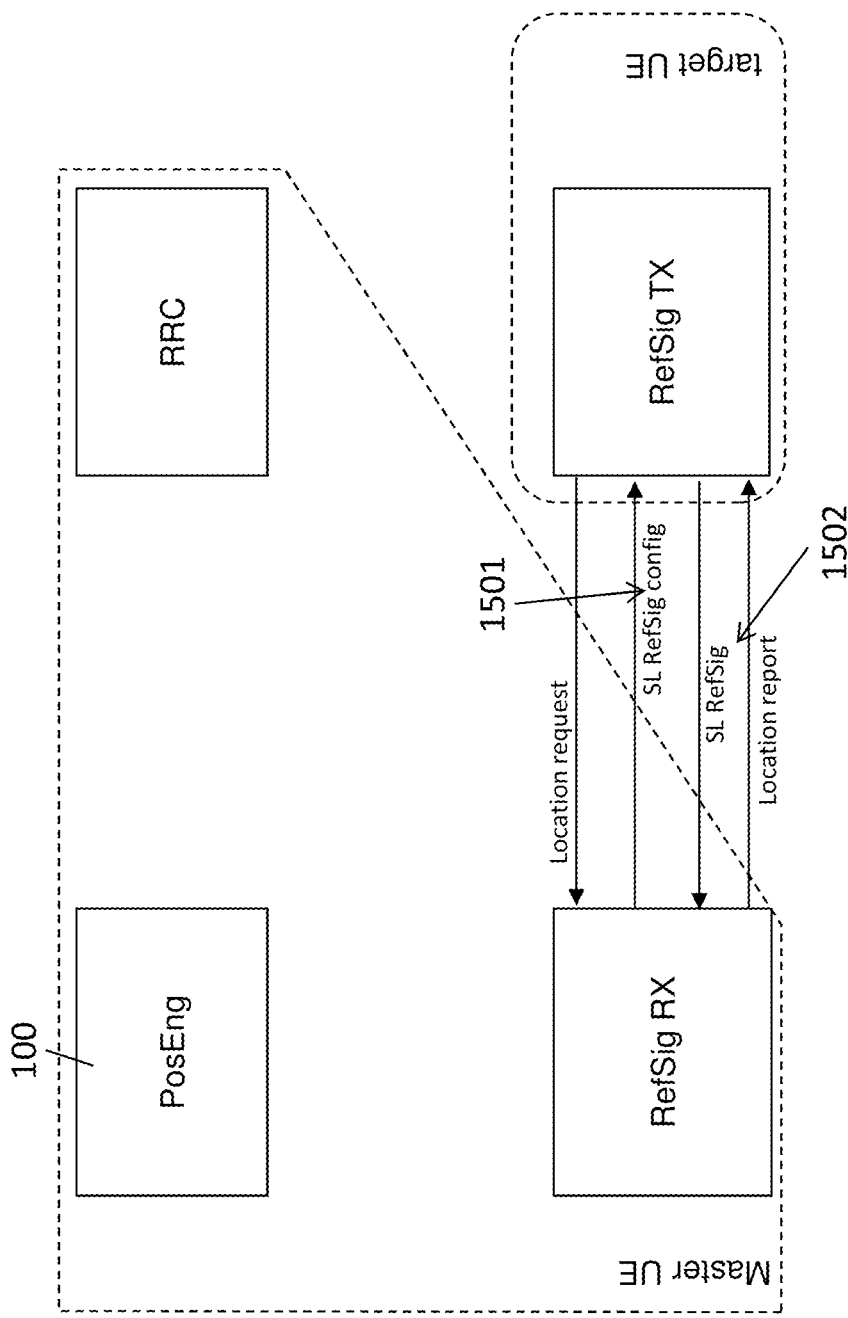
FIG. 19 shows a schematic view of another operating manner of the device according to an embodiment of the present invention.

FIG. 19 shows a schematic view of an operating manner of the positioning device 100, which can also be called Sidelink-assisted UE-based Positioning (PosEng at a second UE). This option refers to a system design where a Master UE with a location server function obtains radio signal measurements in the sidelink and calculates the target UE's position based on at least the sidelink-based measurements.

As shown in FIG. 19, it is assumed that the positioning engine is located in a Master UE, that the sidelink radio resource is indirectly controlled by the RAN or out of the control of the RAN. Examples include using a resource pool and corresponding rules specified by the RAN for sidelink communication. However, the RAN is not involved in resource allocation for every sidelink transmission. The Master UE takes control of the sidelink resource for reference signal transmission and supports sidelink measurements.

Figure 20:
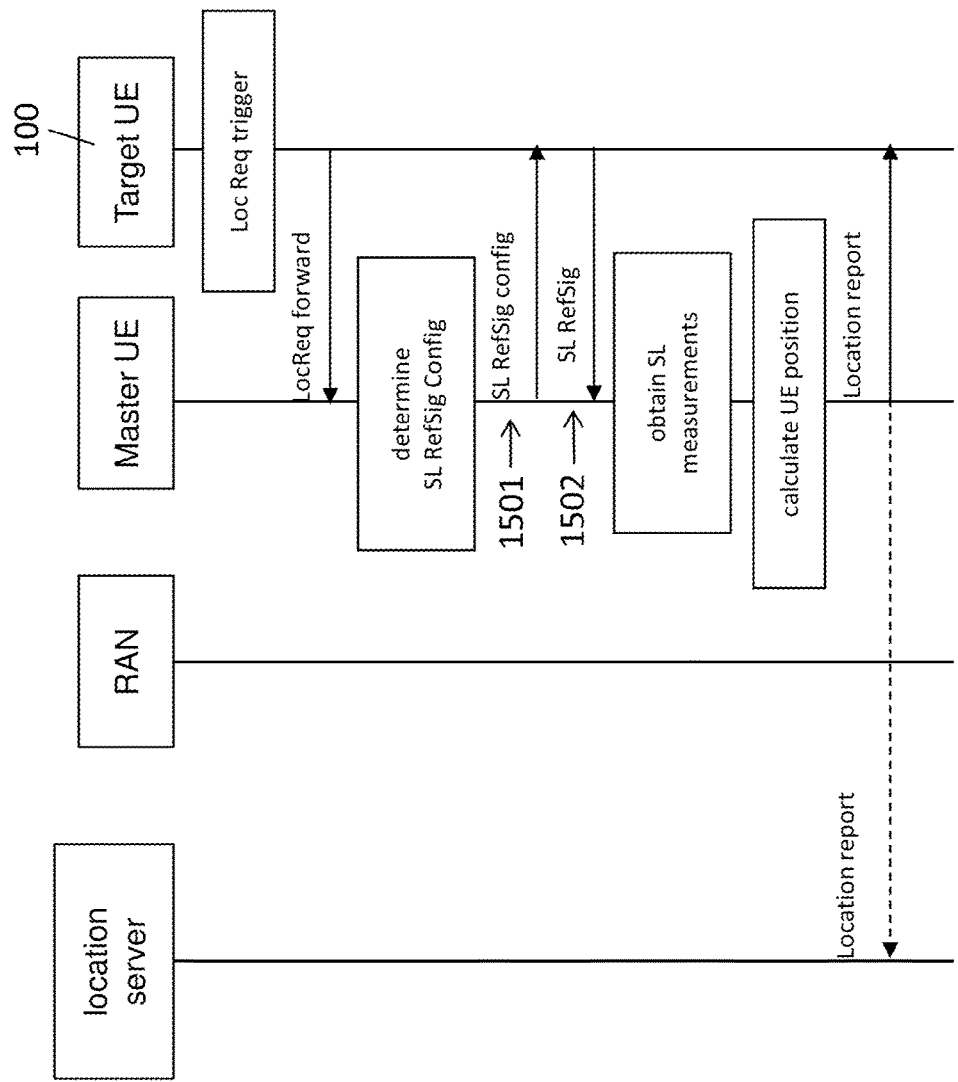
FIG. 20 shows a schematic view of another operating manner of the device according to an embodiment of the present invention.

FIG. 20 shows an example signaling procedure which is used Sidelink-assisted UE-based positioning (RRC and PosEng at a second UE) and which can be performed by the positioning device 100. The steps of this procedure are the following:

1. The Master UE (i.e. the positioning device 100) receives a location request. This location request may be generated by a local application in the target UE or forwarded by another entity in the network to the Master UE. The location request may indicate the required positioning Quality of Service (QoS). Based on the positioning QoS and capability of Master/target UE, the Master UE determines whether and which sidelink radio measurements are desired, then further determines the RefSig 1502 required for obtaining the desired measurement quality 102.
2. The Master UE determines if/how the desired sidelink RefSig 1502 can be allocated and further informs the target UE about the RefSig configuration 1501. This RefSig configuration 1501 may consist of type or features of the RefSig 1502, such as resource allocation, number of repetitions, period, and spatial characteristics such as beam direction.
3. The target UE transmits RefSig 1502 to the Master UE over sidelink according to the RefSig configuration 1501.
4. The Master UE obtains radio signal measurements based on the RefSig 1502 received from the target UE.
5. The Master UE calculates its position based on at least the radio signal measurements. The positioning method may be indicated by the network. As an alternative, the Master UE may choose any positioning method to fuse any kinds of measurements. The Master UE provides location estimate to the target UE. Optionally, the Master UE reports the location update of the target UE to the location server in CN if the location request came from the CN.

In the following section, general features, which all of the above embodiments of FIGS. 1 to 20 may optionally include, are going to be discussed.

A location request generally may be regarded as a message sent by a location service client to a PosEng requesting any location-related service. In addition to the types described in Section 4.4 of TS 23.271, where a location of a target UE is requested, it may also include:

a request for localization of a landmark or an object: The target is not directly involved in radio measurements.

a request for an anchor service: The network provides reference points whose locations are known, in order to assist localization of the targets. In this case, the network only schedules the transmission of the RefSig, no calculation of position is required.

a request for calibration: One entity offers assistance to the other to calibrate location measurements without calculating the actual geographical location.

A network/UE-based method generally may imply that the PosEng is implemented in network/UE.

Downlink/uplink/sidelink-assist generally implies over which link the measurement is obtained.

In general, a RefSig request sent by the entity where PosEng is implemented may consist of at least one/some of the following information:

A desired number of reference anchor (RefSig TXs).

A list of candidate reference anchors' identity and/or measurement reports, neighbor cell IDs, candidate assisting UEs etc.

A desired configuration of a specific type of RefSig, for instance, Channel State Information RefSig (CSI-RS), Phase Tracking RefSig (PT-RS) or Sounding Reference Signal (SRS). These RefSig may not be designed specifically for positioning. The configuration information may consist of:

Frequency related information: bandwidth, number of resource blocks, bandwidth part (BWP), frequency density etc.

Timing related information: periodicity, indicator of TX start, number of repetitions, or an event which triggers RefSig transmission such as motion event, tracking area change etc.

Spatial information: beam index which defines a direction of interest, sector identity, desired direction in terms of azimuth/elevation, or any geographical area description as described in [23032].

A desired measurement type, e.g., RSTD, AoA/AoD (TX beam id), clock drift etc. and/or measurement quality requirements which enables the RRC to determine the corresponding RefSig type and configuration.

In general, a RefSig configuration sent by the RRC may consist of at least one/some of the following information:
- a list of reference anchors' identity and information, e.g., cell IDs, TRP identity, antenna port indices, UE id etc.
- a certain type of RefSig's, e.g., NZP-CSI-RS, ZP-CSI-RS, or PT-RS, configuration including resource information/identity, resource mapping, power configuration, periodicity, beamforming configuration etc. This RefSig may be designed for positioning-related measurements, or a general type of RefSig enabling channel measurement/sounding/tracking.
- Measurement report configuration: type and timing/resource allocation of measurement feedback.

The system design options that are described in view of FIG. 1 to FIG. 20 may be combined with each other or with prior art methods to enable new types of location services. In view of FIG. 21 and FIG. 22, two examples of such embodiments are going to be described.

Figure 21:
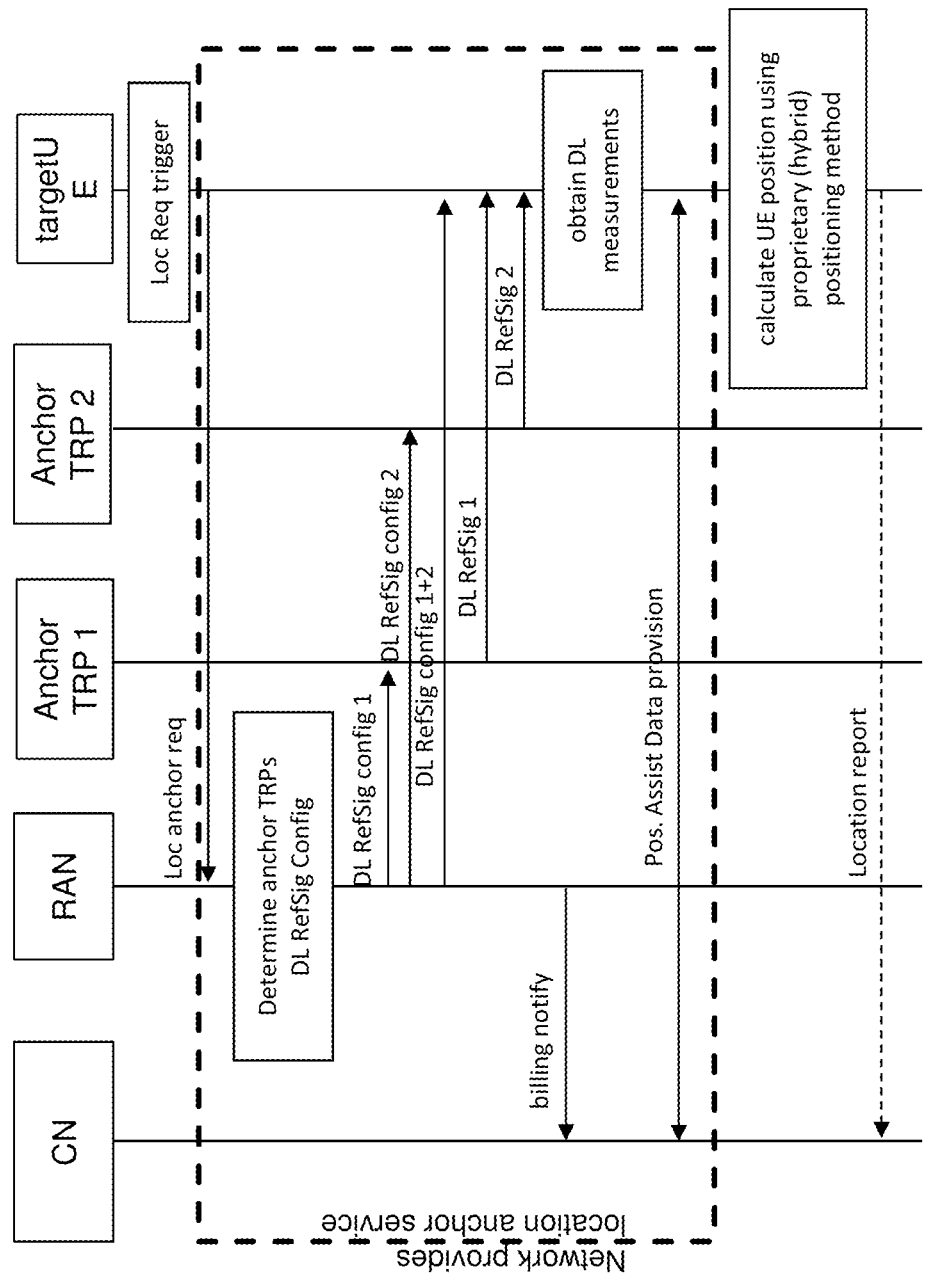
FIG. 21 shows a schematic view of an exemplary embodiment of the present invention.

FIG. 21 shows a schematic view of an exemplary embodiment of the present invention, which is going to be described in the following. In particular, a location anchor service is going to be described.

Similar to GNSS using satellites as anchor points, RAN elements, like base stations or TRPs, whose geolocation are known, may serve as anchor points in GNSS-denied scenarios such as indoor or urban canyon.

An example of a signaling procedure for a location anchor service is provided in FIG. 21. An LCS client may send a request for an anchor service from RAN. The request may consist of a number of anchors desired, and types and configuration of the RefSig required. The RAN shall determine the anchor TRPs from where the RefSig for positioning measurement can be scheduled. Based on the amount of radio resources consumed by positioning measurements, the network provider may apply a billing model for location anchor service. In such a way, the RAN elements transmit RefSig for positioning in an on-demand manner, enable the UE-type devices to obtain measurements.

The positioning engine may retrieve these measurements and based on which derive the geolocation of the targets. The positioning engine is not necessarily part of the network provider.

For device side applications with stringent performance requirements, the positioning engine may fuse any types of measurements on hand, such as GPS/WiFi signals, sensors output, radar/Lidar, or camera, etc.

This service enables efficient radio support for proprietary hybrid positioning methods and generates a new business model for network provider.

Figure 22:
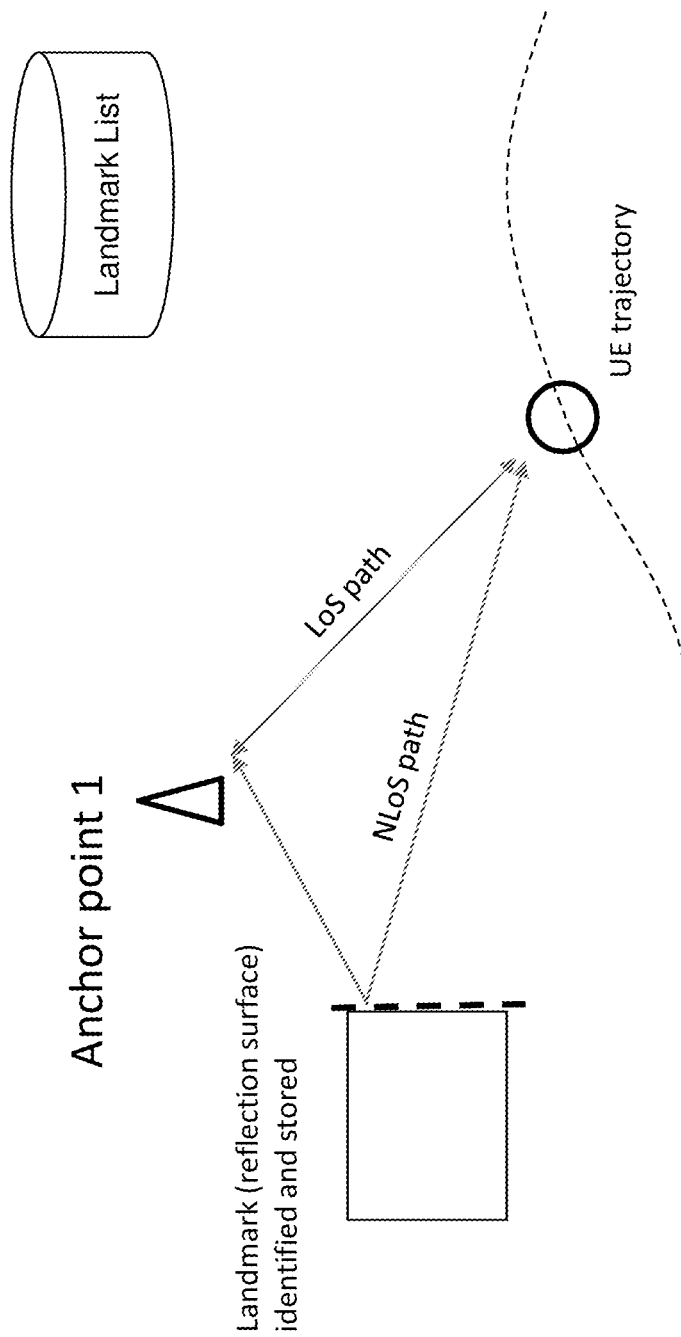
FIG. 22 shows a schematic view of another exemplary embodiment of the present invention.

FIG. 22 shows a schematic view of an exemplary embodiment of the present invention, which is going to be described in the following. In particular, simultaneous localization and mapping (SLAM) (e.g., industrial applications, factory mapping) is going to be described.

SLAM, which is traditionally applied for localizing a mobile robot in an unknown environment, functions by incrementally building a consistent map of this environment while simultaneously determining the robot's location within this map. Such a concept can be applied to the mobile radio network, allowing a mapping application, serving as a positioning engine, building up a landmark lists within the region of interest with the assistance of moving UEs. In order to identify landmark of interest, e.g., a reflection service, the positioning engine may request RefSig transmitted in certain directions so that a reflection path (NLoS path) can be measured. By continuously tracking the reflection path, this landmark can be identified, as illustrated in FIG. 22. A moving UE identifies major transmission paths (LoS/NLoS) during the initial access (synchronization, beam-sweeping) phase. In order to refine the location estimation of the reflection surface using the NLoS paths, a PosEng may request, e.g., a beamformed RefSig transmitted to the direction of NLoS with its update period corresponding to the UE velocity.

Figure 23:
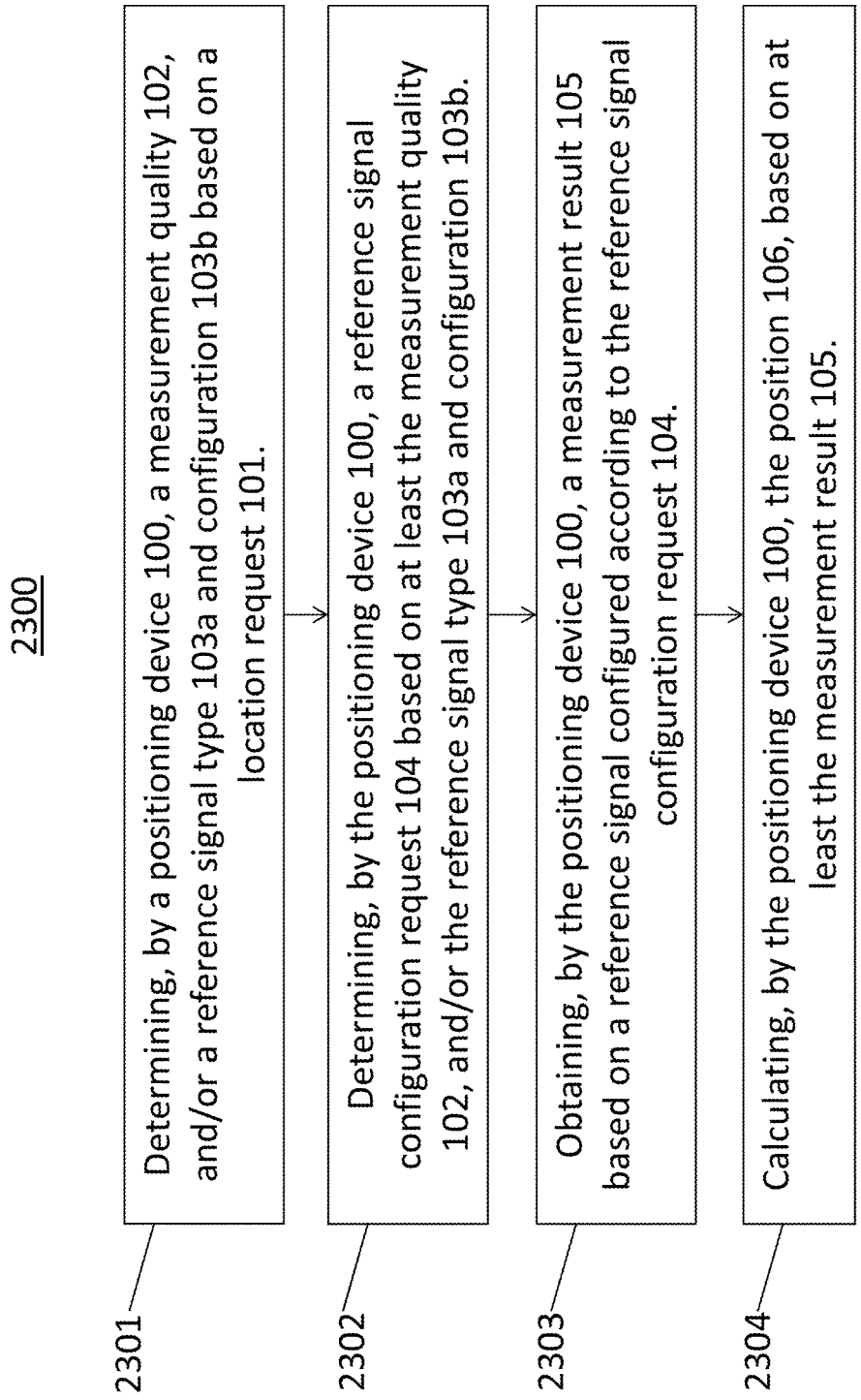
FIG. 23 shows a schematic view of a method according to an embodiment of the present invention.

FIG. 23 shows a method 2300 according to an embodiment of the present invention. The method 2300 is for operating the positioning device 100 and comprises a first step of determining 2301, by the positioning device 100, a measurement quality 102, and/or a reference signal type 103a and configuration 103b based on a location request 101.

The method 2300 comprises a second step of determining 2302, by the positioning device 100, a reference signal configuration request 104 based on at least the measurement quality 102, and/or the reference signal type 103a and configuration 103b.

The method 2300 comprises a third step of obtaining 2303, by the positioning device 100, a measurement result 105 based on a reference signal configured according to the reference signal configuration request 104.

The method 2300 comprises a fourth step of calculating 2304, by the positioning device 100, the position 106, based on at least the measurement result 105.

Figure 24:
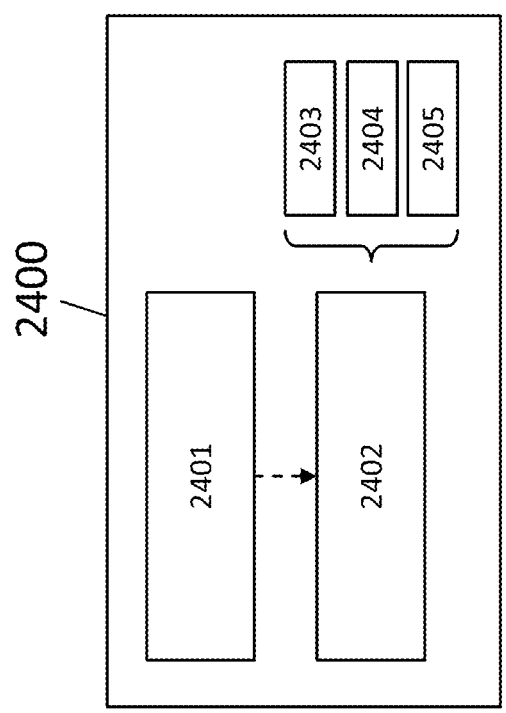
FIG. 24 shows a schematic view of a radio resource controller according to an embodiment of the present invention.

FIG. 24 shows a RRC 2400 according to an embodiment of the present invention. The RRC 2400 is configured to obtain a reference signal configuration request 2401, and to determine a reference signal configuration 2402 based on at least the reference signal configuration request 2401. The RRC 2400 is further configured to determine the reference signal configuration 2402 to be at least one of a downlink (DL) reference signal configuration 2403, an uplink (UL) reference signal configuration 2404, or a sidelink (SL) reference signal configuration 2405.

Figure 25:
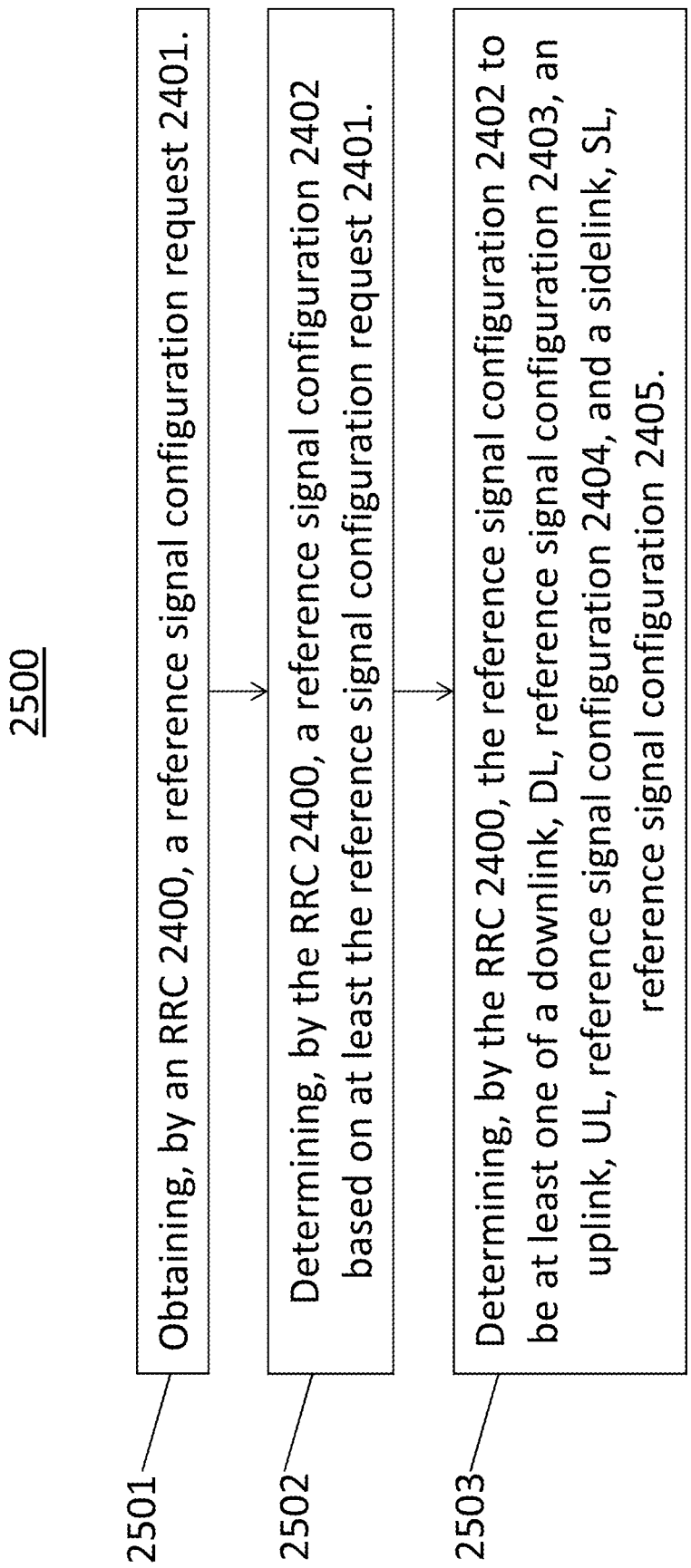
FIG. 25 shows a schematic view of a method according to an embodiment of the present invention.

FIG. 25 shows a method 2500 according to an embodiment of the present invention. The method 2500 is for operating the RRC 2400 and comprises a first step of obtaining 2501, by an RRC 2400, a reference signal configuration request 2401.

The method 2500 comprises a second step of determining 2502, by the RRC 2400, a reference signal configuration 2402 based on at least the reference signal configuration request 2401.

The method 2500 comprises a third step of determining 2503, by the RRC 2400, the reference signal configuration 2402 to be at least one of a downlink (DL) reference signal configuration 2403, an uplink (UL) reference signal configuration 2404, or a sidelink (SL) reference signal configuration 2405.

Figure 26:
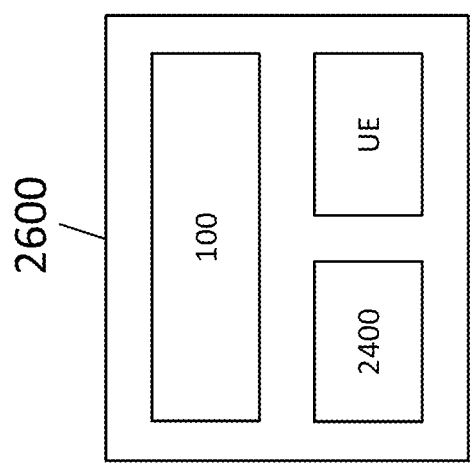
FIG. 26 shows a schematic view of a system according to an embodiment of the present invention.

FIG. 26 shows a system, e.g., a communication system, 2600 according to an embodiment of the present invention. The system is for position calculation of a mobile device (e.g., a UE), and comprises a positioning device 100 according to any one of FIG. 1 to FIG. 22, a RRC 2400 according to FIG. 24 and/or at least one user equipment (UE).

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A positioning device for calculating a position of a mobile device, comprising:
   a processor; and
   a non-transitory computer-readable storage medium coupled to the processor and storing programming instructions, that when executed by the processor, cause the processor to:
   determine a measurement quality, and/or reference signal information based on a positioning request, the reference signal information including a reference signal type or a reference signal configuration,
   determine a reference signal configuration request based on at least the determined measurement quality, and/or the determined reference signal information,
   obtain a measurement result based on a reference signal configured according to the determined reference signal configuration request, and
   calculate the position based on at least the obtained measurement result,
   wherein the reference signal type is a downlink (DL) reference signal type, and the reference signal configuration request comprises a request for a DL reference signal, and the obtaining of the measurement result based on the reference signal configured according to the determined reference signal configuration request comprises:
   sending the reference signal configuration request to a radio resource controller (RRC), and
   receiving a DL reference signal configuration for configuring the reference signal.

2. The positioning device according to claim 1, wherein the reference signal configuration request comprises at least one of a first measurement report configuration, a configuration, a periodicity, or a number of repetitions.

3. The positioning device according to claim 1, wherein the reference signal configuration comprises at least one of a second measurement report configuration, a granted configuration, a periodicity, or a number of repetitions.

4. A method for calculating a position of a mobile device, comprising:
   determining a measurement quality, and/or reference signal information based on a location request, the reference signal information including a reference signal type and a reference signal configuration,
   determining a reference signal configuration request based on at least the determined measurement quality, and/or the determined reference signal information,
   obtaining a measurement result based on a reference signal configured according to the determined reference signal configuration request, and
   calculating the position, based on at least the obtained measurement result,
   wherein the reference signal type is a downlink (DL) reference signal type, and the reference signal configuration request comprises a request for a DL reference signal, and the obtaining of the measurement result based on the reference signal configured according to the determined reference signal configuration request comprises:
   sending the reference signal configuration request to a radio resource controller (RRC), and
   receiving a DL reference signal configuration for configuring the reference signal.

* * * * *